(12) United States Patent
Yamato et al.

(10) Patent No.: US 6,369,817 B1
(45) Date of Patent: Apr. 9, 2002

(54) IMAGE SYNTHESIS SYSTEM

(75) Inventors: Sachio Yamato, Eucyu; Daisaku Yamane, Mitaka; Masashi Ishikawa, Tama; Koji Kashiwade, Mitaka; Toshiharu Mimura, Suginami; Kengo Toeda, Koganei, all of (JP)

(73) Assignee: Japan Radio Co., Ltd., Tokyo (JP)

( * ) Notice: Subject to any disclaimer, the term of this patent is extended or adjusted under 35 U.S.C. 154(b) by 0 days.

(21) Appl. No.: 09/315,379

(22) Filed: May 18, 1999

(30) Foreign Application Priority Data

| May 25, 1998 | (JP) | .......................................... | 10-143399 |
| Oct. 19, 1998 | (JP) | .......................................... | 10-297269 |

(51) Int. Cl.$^7$ .............................................. G06T 17/00
(52) U.S. Cl. ...................................... 345/424; 345/419
(58) Field of Search ................................ 345/418, 419, 345/420, 421, 422, 423, 424, 425, 426

(56) References Cited

U.S. PATENT DOCUMENTS

| 5,831,623 | A | * | 11/1998 | Negishi et al. | .............. | 345/424 |
| 5,900,880 | A | * | 5/1999 | Cline et al. | ................. | 345/423 |
| 6,008,813 | A | * | 12/1999 | Lauer et al. | ................ | 345/418 |
| 6,040,835 | A | * | 3/2000 | Gibson | ........................ | 345/426 |
| 6,084,593 | A | * | 7/2000 | Gibson | ........................ | 345/424 |
| 6,219,059 | B1 | * | 4/2001 | Argiro | ......................... | 345/424 |
| 6,219,060 | B1 | * | 4/2001 | Ludke et al. | ................ | 345/424 |

FOREIGN PATENT DOCUMENTS

| JP | 7-120434 | 10/1993 |

OTHER PUBLICATIONS

Norihiko Naono: "Direct Rambus Aims at Main Memory of Personal Computer In 1999 (First Volume)", Nikkei Electronics, No. 708, Jan., 26, 1998 —Partial Translation.

Norihiko Naono: "Direct Rambus Aims at Mail Memory of Personal Computer in 1999 (Latter Volume) ", Nikkei Electronics, No. 710, Feb., 23, 1999 —Partial Translation.

* cited by examiner

Primary Examiner—Cliff N. Vo
(74) Attorney, Agent, or Firm—Frishauf, Holtz, Goodman, Langer & Chick, P.C.

(57) ABSTRACT

An image synthesis system comprises a volume memory for accumulating entire volume data after being divided into cubic data comprising units each of which is composed of eight pieces of volume data for constructing a small cube to make it possible to perform memory operation by using the units of the cubic data; an image processing unit including a memory control unit, an inclination calculation unit, a brightness calculation unit, a synthesis calculation unit, and a coordinate conversion unit; an image display memory; and a display unit. The volume data is read from the volume memory by using the units each of which is composed of eight voxels for constructing the small cube. The inclination calculation is performed by the inclination calculation unit, the brightness is calculated by the brightness calculation unit, and the synthesis calculation unit is used to perform the synthesis calculation for the entire volume data along voxels through which an arbitrarily set imaginary line of sight passes.

27 Claims, 27 Drawing Sheets

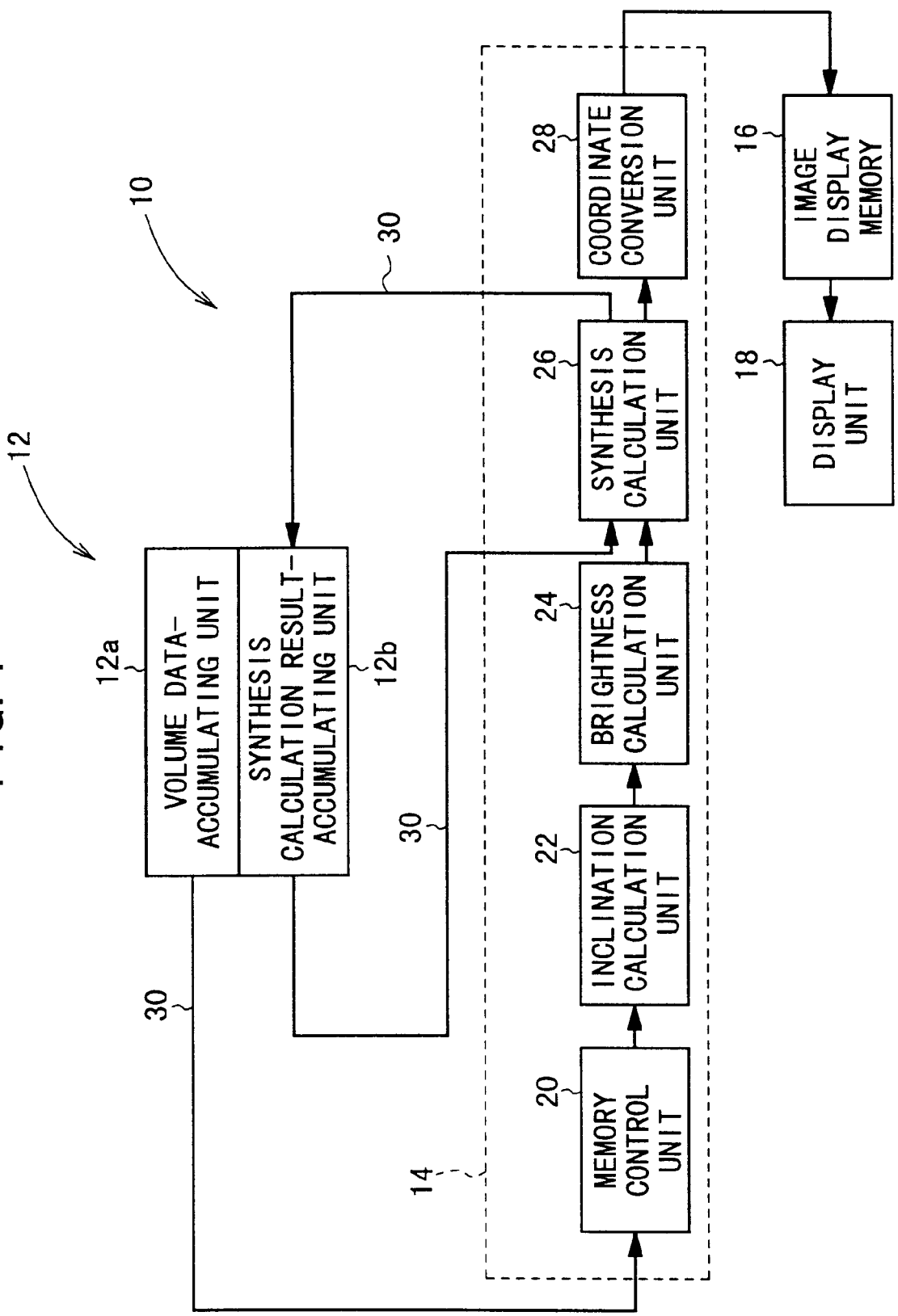

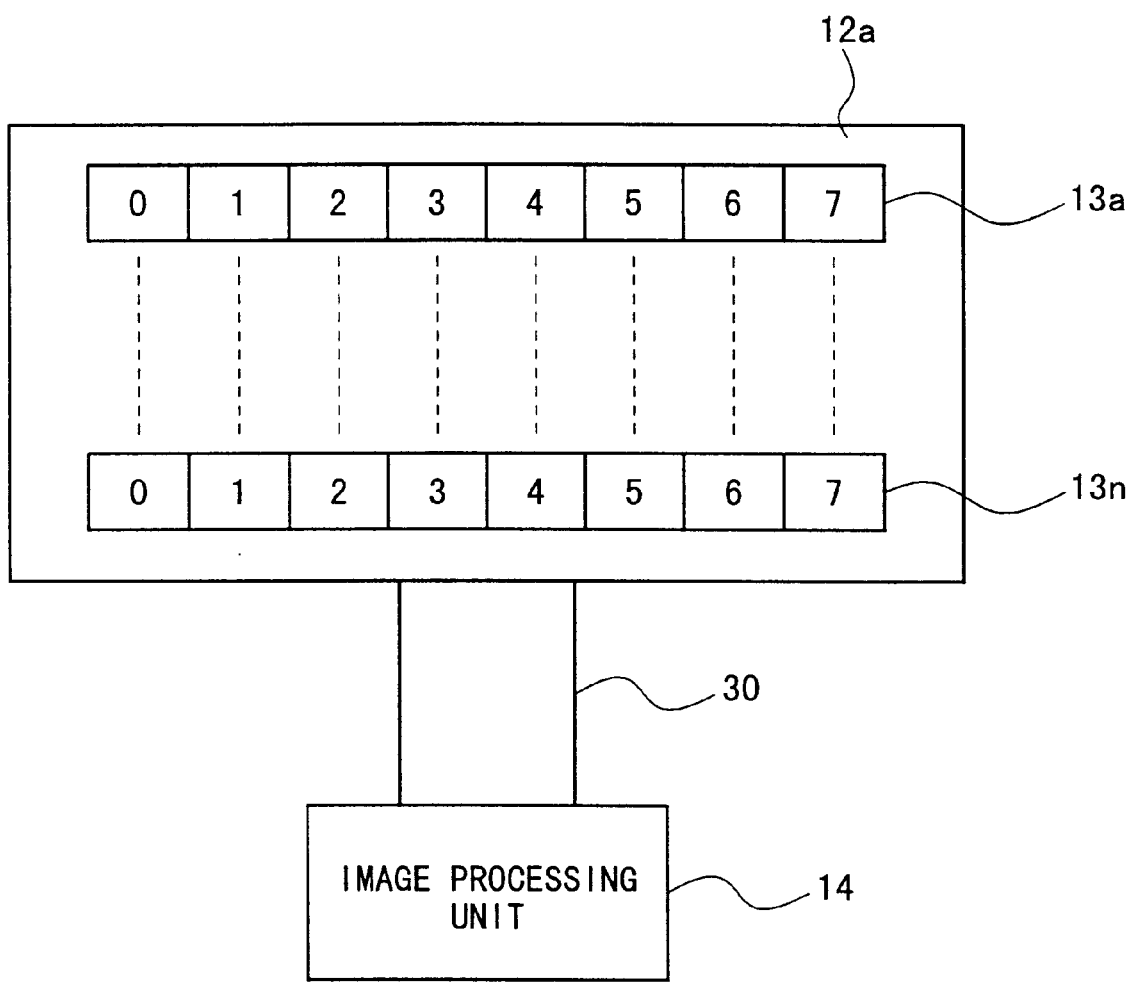

301

301

301

301

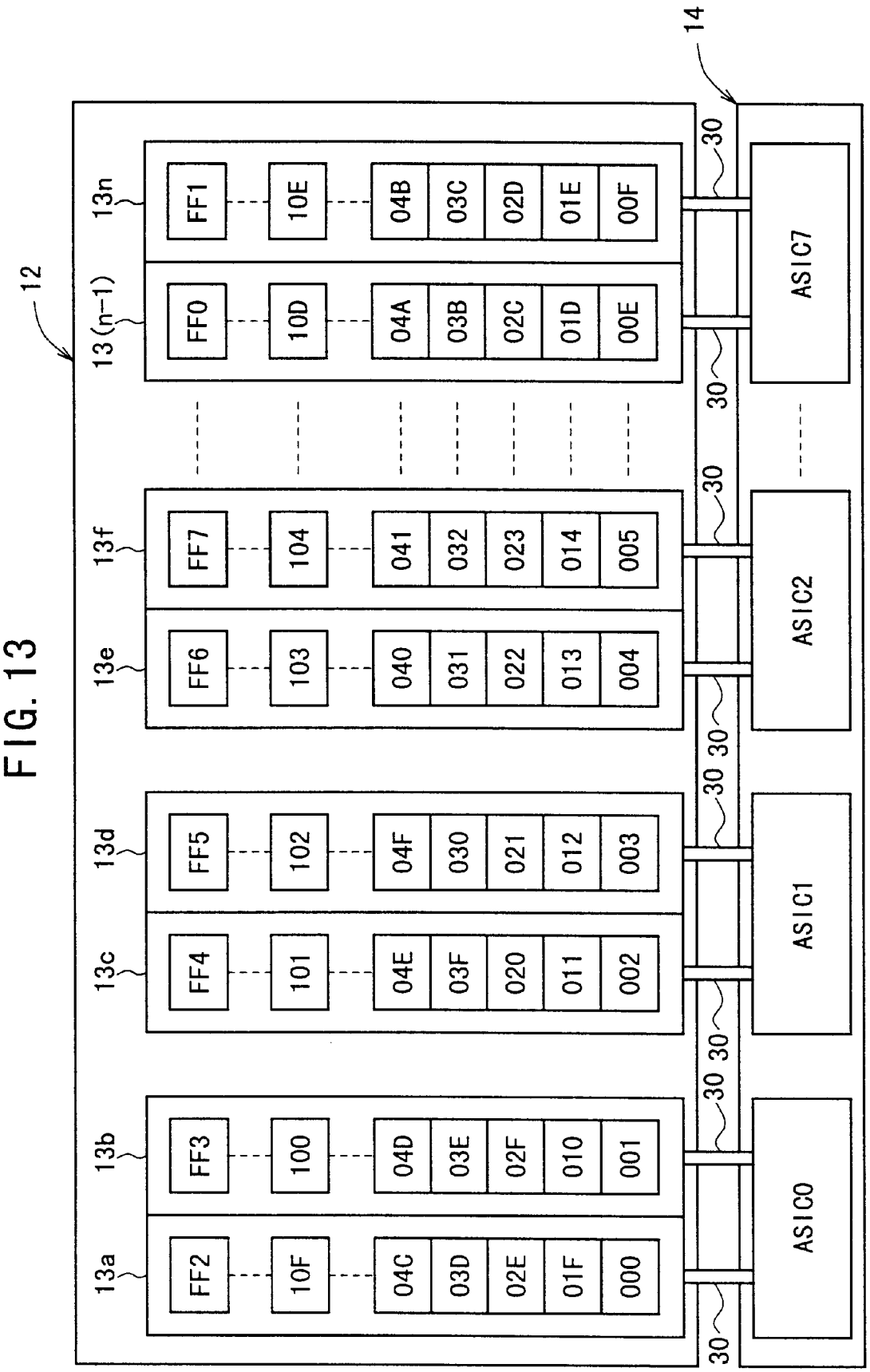

FIG. 15

| PRINCIPAL AXIS | LATERAL AXIS | k=0 | k=1 | k=2 | k=3 | k=4 | k=5 | k=E | k=F |
|---|---|---|---|---|---|---|---|---|---|
| Z=0 | Y=0 | 000 | 001 | 002 | 003 | 004 | 005 | 00E | 00F |
| Z=0 | Y=1 | 01F | 010 | 011 | 012 | 013 | 014 | 01D | 01E |
| Y=0 | X=0 | 000 | 100 | 200 | 300 | 400 | 500 | E00 | F00 |
| Y=0 | X=1 | F01 | 001 | 101 | 201 | 301 | 401 | D01 | E01 |
| Y=3 | X=4 | 934 | A34 | B34 | C34 | D34 | E34 | 734 | 834 |
| Y=8 | X=2 | 682 | 782 | 882 | 982 | A82 | B82 | 482 | 582 |
| X=0 | Z=0 | 000 | 010 | 020 | 030 | 040 | 050 | 0E0 | 0F0 |
| X=3 | Z=7 | 763 | 773 | 783 | 793 | 7A3 | 7B3 | 743 | 753 |
| X=F | Z=F | F2F | F3F | F4F | F5F | F6F | F7F | F0F | F1F |

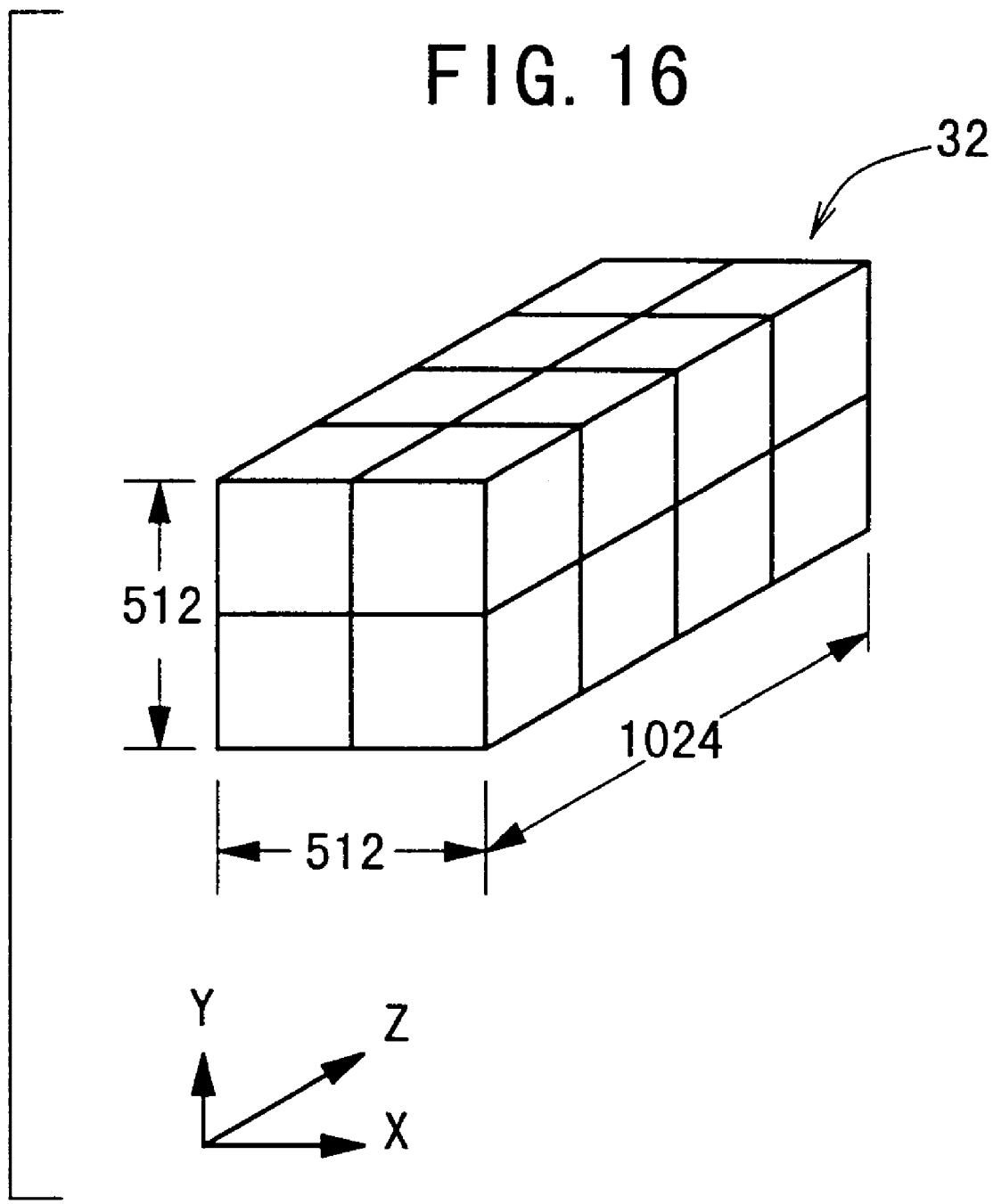

| 0 | 1 | 2 | 3 | 4 | 5 | 6 | 7 | 8 |
|---|---|---|---|---|---|---|---|---|
| P | | PS | | | | C | | R | x

FIG. 17A

| 0 | 1 | 2 | 3 | 4 | 5 | 6 | 7 | 8 |
|---|---|---|---|---|---|---|---|---|
| P | | R | | | | C | | CS |

| 0 | 1 | 2 | 3 | 4 | 5 | 6 | 7 | 8 | 9 |
|---|---|---|---|---|---|---|---|---|---|
| P | | R | | | C | | B | CS | |

FIG. 18
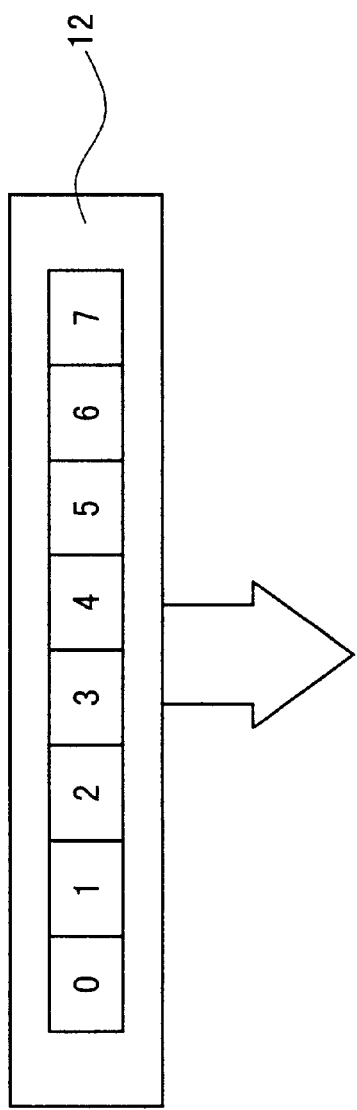
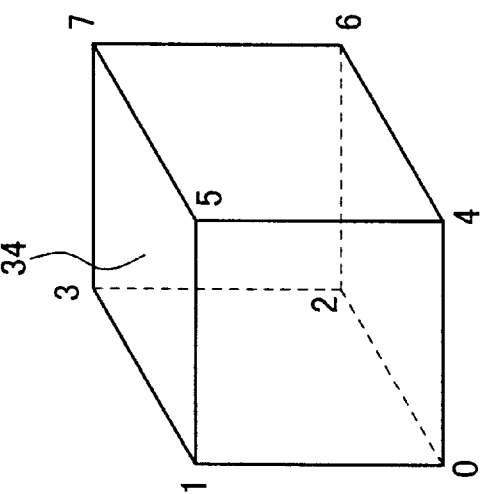
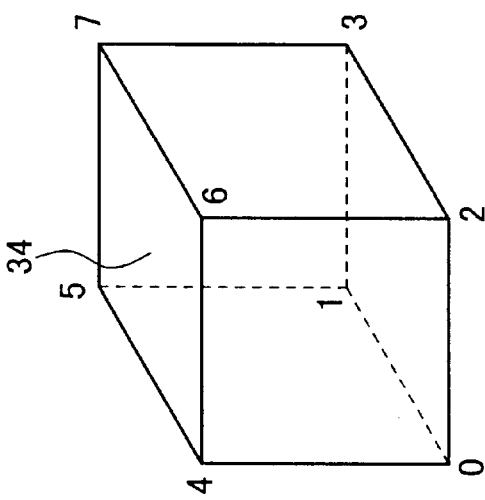
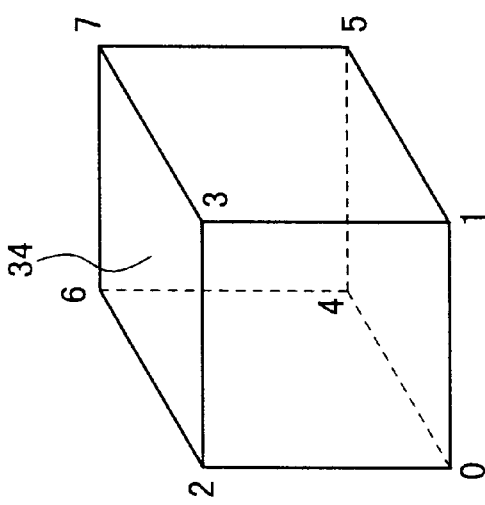

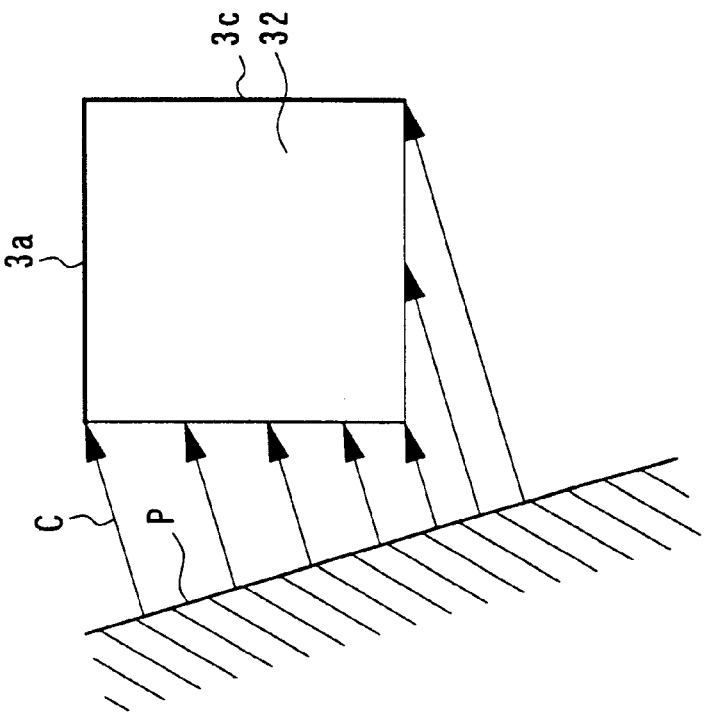
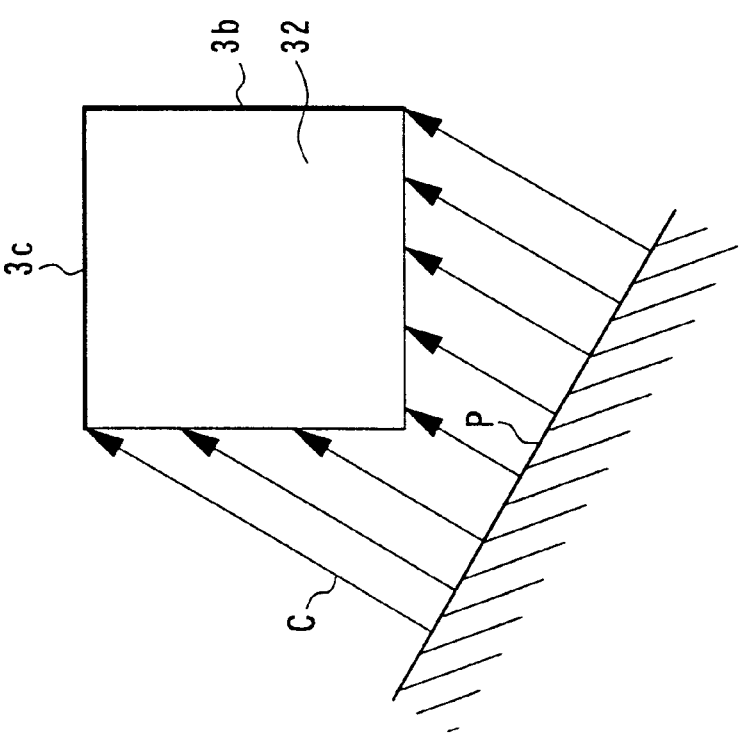

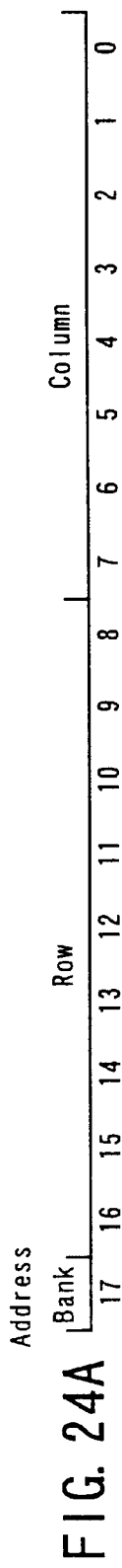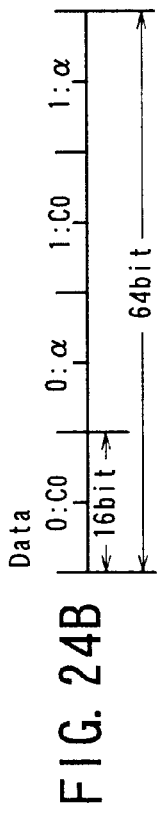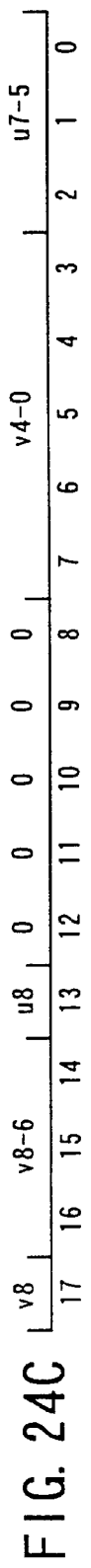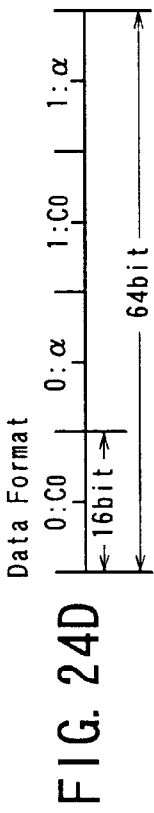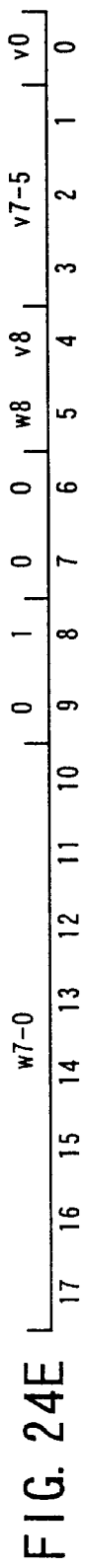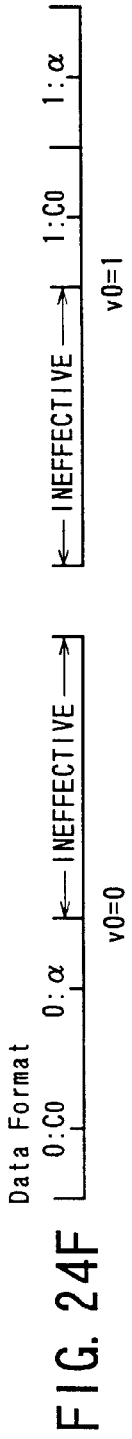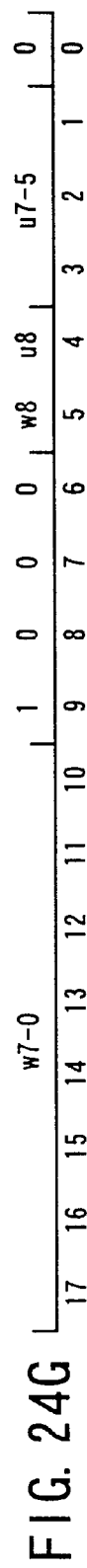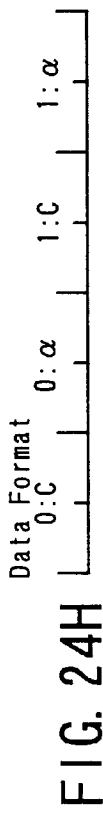

| POSITION | NUMBER | u | v | w |
|---|---|---|---|---|
| LOWER-LEFT FRONT | ① | 0~255 | 0~255 | 0~255 |
| LOWER-RIGHT FRONT | ② | 256~511 | 0~255 | 0~255 |
| UPPER-LEFT FRONT | ③ | 0~255 | 256~511 | 0~255 |
| UPPER-RIGHT FRONT | ④ | 256~511 | 256~511 | 0~255 |
| LOWER-LEFT BACK | ⑤ | 0~255 | 0~255 | 256~511 |
| LOWER-RIGHT BACK | ⑥ | 256~511 | 0~255 | 256~511 |
| UPPER-LEFT BACK | ⑦ | 0~255 | 256~511 | 256~511 |
| UPPER-RIGHT BACK | ⑧ | 256~511 | 256~511 | 256~511 |

FIG. 26A
| u | v | w | SEQUENCE 1, 2, 3, 4, 5, 6, 7, 8 |
|---|---|---|---|
| + | + | + | ①, ②, ③, ④, ⑤, ⑥, ⑦, ⑧ |
| − | + | + | ②, ①, ④, ③, ⑥, ⑤, ⑧, ⑦ |
| + | − | + | ③, ④, ①, ②, ⑦, ⑧, ⑤, ⑥ |
| − | − | + | ④, ③, ②, ①, ⑧, ⑦, ⑥, ⑤ |
| + | + | − | ⑤, ⑥, ⑦, ⑧, ①, ②, ③, ④ |
| − | + | − | ⑥, ⑤, ⑧, ⑦, ②, ①, ④, ③ |
| + | − | − | ⑦, ⑧, ⑤, ⑥, ③, ④, ①, ② |
| − | − | − | ⑧, ⑦, ⑥, ⑤, ④, ③, ②, ① |
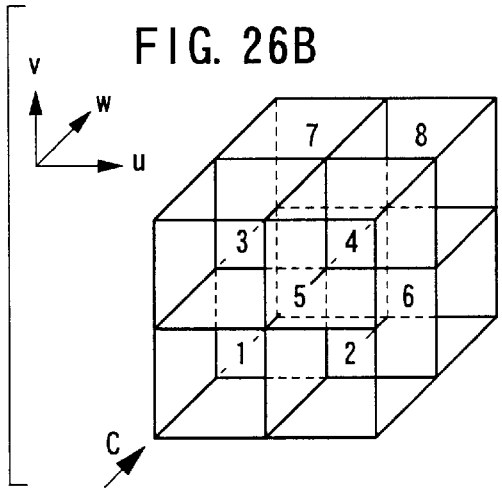
FIG. 26B
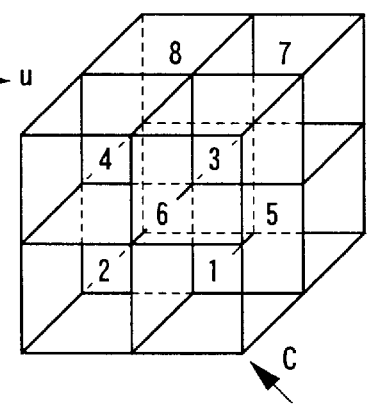
FIG. 26C
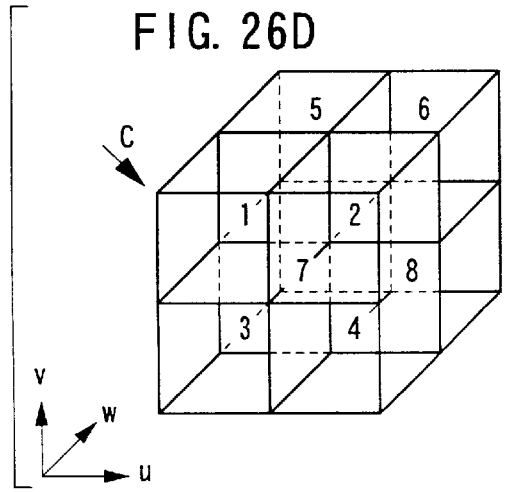
FIG. 26D
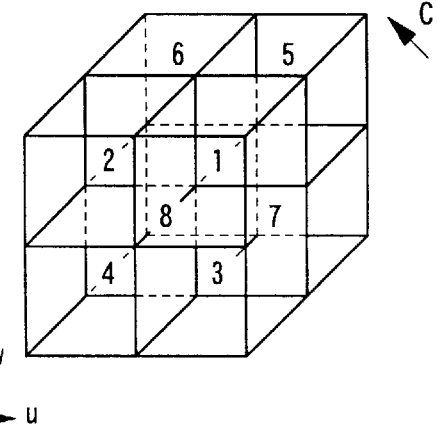
FIG. 26E

IMAGE SYNTHESIS SYSTEM

BACKGROUND OF THE INVENTION

1. Field of the Invention

The present invention relates to a volume rendering technique which plays an important role when numeric data (volume data) defined in a three-dimensional space is visualized on a display screen. In particular, the present invention relates to a hardware-equipped image synthesis system which makes it possible to perform high speed drawing processing for three-dimensional volume data to be displayed on a display screen. Further, the present invention relates to an image synthesis system constructed by using a small amount of hardware resources.

2. Description of the Related Art

The technique, which is used when a three-dimensional model represented by numeric data (volume data) defined in a three-dimensional space is visualized on a screen of a display unit, is called "volume rendering". For example, in the medical field, the volume rendering technique is utilized when numeric data (volume data) concerning the inside of human body, which is obtained by using a measuring instrument such as CT scanner and MRI, is displayed as an image on a display. Further, the volume rendering technique is also utilized in a variety of fields.

The volume data for representing the three-dimensional model is expressed by using various methods. However, there is a method in which expression is made by using a set of small cubes (voxels) arranged on a three-dimensional lattice, in the same manner as in the method in which a figure on a two-dimensional plane is expressed by using a set of small square picture elements (pixels) arranged on two-dimensional lattice points.

The technique for expressing the three-dimensional model by means of the voxel expression has the following features. That is, although the amount of data is enormous, the data structure is simple, in which the set operation can be performed extremely easily. The technique is not limited to the expression of a three-dimensional model which is artificial and regular, but it is suitable when an extremely irregular shape existing in the nature is expressed.

One of known rendering techniques based on CG (Computer Graphics) is a technique called "ray casting method" or "ray tracing method". In the ray casting method, an objective three-dimensional model, which is constructed by voxels, is arranged in an imaginary three-dimensional space defined in a memory space. Numeric data, which represents internal information of the objective three-dimensional model, is given as volume data to each of the voxels. According to the ray casting method, various pieces of internal information concerning the objective three-dimensional model can be freely visualized depending on the purpose. Therefore, this method attracts attention in recent years as a new visualizing technique (volume visualization) for the three-dimensional model represented by those for living bodies.

The volume data as described above includes data called "field data" on the point (voxel) on the three-dimensional lattice. The field data is data, for example, for the color value and the transparency. In the case of the CT scanner, the density of the tissue in the living body is used as the field data. The voxels are colored in accordance with the density to display (visualize) the volume data on the screen. Thus, the situation of the entire data can be made more comprehensible.

The method for visualizing the volume data has been hitherto roughly classified into two kinds of methods. The first method is the surface rendering method in which voxels having equal data in the volume data are connected to one another to form an equivalent surface, and primitives such as surfaces and lines are allotted to the equivalent surface to make display. The second method is the method in which the volume data is directly displayed by using, for example, the ray casting method.

When the surface rendering method is used, an equivalent surface (appreciated as expansion of the two-dimensional contour line) is prepared by connecting equal volume data. Surfaces and patches are applied to the equivalent surface to perform the rendering by means of the surface graphics so that the display is made. That is, this method is also called "slice-by-slice method". Japanese Patent Publication (a publication of examined application) No. 7-120434 shows that the details of the method are described in the following document (A).

(A) Drebin, R. A., Carpenter, L., and Hanrahan, P., "Volume Rendering", Computer Graphics, Vol. 22, No. 4, pp. 65–74, 1988.

When the ray casting method is used, the following procedure is adopted. That is, rays (lines of sight) passing through respective cells are generated from a point of sight (pixel) on a surface to be displayed (surface on the display). The volume data is subjected to integration along the rays. Actually, in place of the integration, approximate calculation is performed by means of numerical integration based on the use of values obtained at several sampling points disposed along the rays.

The sampling method includes a method in which sampling is performed at equal intervals along the rays, and a method in which points of intersection between the ray and the cell are used as sampling points to make evaluation. The objective data is the volume data defined on the orthogonal structural lattice in the former case or on the non-structural lattice in the latter case. The Japanese Patent Publication No. 7-120434 also shows that the details of the above are described in the following documents (B) and (C).

(B) Levoy, M., "Display of Surfaces from Volume Data", IEEE Computer Graphics and Applications, Vol. 8, No. 3, pp. 29–37, 1988.

(C) Garrity, M. P., "Raytracing Irregular Volume Data", Computer Graphics, Vol. 24, No. 5, pp. 35–40, 1990.

However, in the present circumstances, when it is intended to realize a high degree of display function by means of the conventional volume rendering technique as described above, it is necessary for any of the techniques to use enormous calculation time.

Such a situation results from the following fact. That is, in the case of the two-dimensional surface rendering, exclusive processors have been developed for the purpose of high speed processing, and they are commercially provided to the market as major constitutive elements for the engineering work station. As compared with the two-dimensional surface rendering, no hardware-equipped apparatus capable of high speed processing has been provided for the three-dimensional process, because of the following reasons.

That is, the following fact is firstly pointed out. A large capacity memory is required to accumulate the volume data for the three-dimensional space. Further, in order to perform the operation processing for the volume data in real time, it is necessary to read, at a high speed, the data accumulated in the large capacity memory. However, neither suitable memory nor appropriate interface is available to solve such a problem, resulting in an obstacle to realize hardware equipment.

Secondly, there has been the following cause. That is, in order to realize the three-dimensional visualization, it is necessary to perform the data sampling from the volume data over the entire three-dimensional space. When the sampled volume data is subjected to operation, a large capacity memory is required to accumulate intermediate results of the calculation. Therefore, it is difficult to realize hardware equipment. Such a process has been hitherto realized dominantly by using any software.

Because of the reasons as described above, a lot of time has been hitherto required for the apparatus for visualizing the volume data concerning the three-dimensional space. An inconvenience arises in that when the point of sight or the objective body is moved in the three-dimensional space, it is difficult to synthesize, in real time, an image which reflects the movement.

When the three-dimensional image is displayed by using the conventional volume rendering technique, it is necessary to use enormous volume data concerning the three-dimensional space for expressing the three-dimensional model. Therefore, it is required to accumulate the volume data in a large capacity volume memory. When it is intended to deal with the entire three-dimensional volume data accommodated in the large capacity volume memory at once so that the operation processing is performed to effect visualization (image processing), an inconvenience arises in that it is necessary to use a huge amount of hardware resources.

For example, when the volume data of respective voxels is subjected to the operation along the rays by using the ray casting method described above, it is a matter of course that a large capacity memory to accumulate intermediate results is required as a memory to accumulate the intermediate results of the operation. The necessity for the hardware resources having the large capacity as described above causes prohibition of hardware equipment for the image processing unit for processing the three-dimensional volume data.

SUMMARY OF THE INVENTION

A general object of the present invention is to provide a hardware-equipped image synthesis system which makes it possible to perform high speed drawing for three-dimensional volume data on a display.

A principal object of the present invention is to provide an image synthesis system which makes it unnecessary to retain intermediate calculation results and which makes it possible to make the memory capacity necessary and minimum.

Another object of the present invention is to realize, with a small amount of hardware resources, an image synthesis system which makes it possible to perform high speed drawing for three-dimensional volume data on a display.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 1 shows a schematic arrangement of an image synthesis system concerning a first embodiment to carry out the three-dimensional volume rendering according to the present invention;

FIG. 3 conceptually shows the volume data accommodated in the volume memory;

FIGS. 8A and 8B show the relationship between a central voxel and voxels adjacent thereto, required for the inclination calculation, wherein FIG. 8A shows a perspective view, and FIG. 8B shows a front view;

FIGS. 11A and 11B explain the synthesis calculation process performed in the synthesis calculation unit, wherein FIG. 11A shows a perspective view, and FIG. 11B shows a side view;

FIGS. 12A to 12D explain the reading of the volume data in the inclination calculation, wherein FIG. 12A shows a back surface, FIG. 12B shows a central front side, FIG. 12C shows a central back side, and FIG. 12D shows a front surface;

FIG. 13 shows a connected arrangement of the volume memory and the image processing unit (ASIC);

FIG. 14B illustrates the entire volume data;

FIG. 15 shows an example of reading of the volume data when the principal axis is changed;

FIG. 16 shows the structure of the volume memory composed of 512×512×1024 for accumulating the volume data;

FIGS. 17A to 17C show an example of the address map in the case of the memory structure shown in FIG. 16;

FIG. 18 explains the process of reading of the volume data;

FIG. 20A shows a top view illustrating the concept of the volume rendering and the concept of the base plane memory, and FIG. 20B shows a side view thereof;

FIGS. 24A to 24H show the memory address format and the data format used when results of the synthesis calculation are stored in and read from the temporary storage memory;

FIG. 26A shows the processing sequence for the divided volume data depending on the direction of the line of sight in the volume rendering, and FIGS. 26B to 26E show the processing sequence for the divided volume data depending on the difference in direction of line of sight.

DESCRIPTION OF THE PREFERRED EMBODIMENTS

Figure 2A:
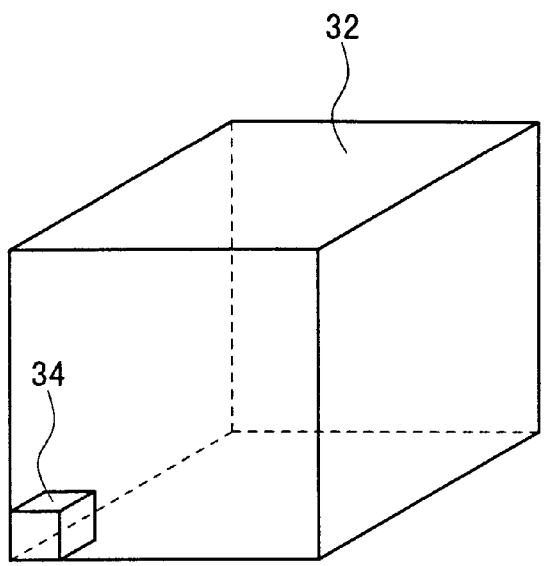
FIG. 2A shows the entire volume data.

At first, reference will be made to a first embodiment of the image synthesis system according to the present invention, and explanation will be made in detail below with reference to the accompanying drawings.

FIG. 1 shows a system construction illustrating a schematic arrangement of an image synthesis system to carry out the three-dimensional volume rendering according to the present invention.

The image synthesis system 10 according to the embodiment of the present invention comprises a volume memory 12 constructed by a high speed transfer bus memory including a volume data-accumulating unit 12a for accumulating volume data for representing a model in a three-dimensional space and a synthesis calculation result-accumulating unit 12b for accumulating results of synthesis calculation; an image processing unit 14 including a memory control unit 20, an inclination calculation unit 22, a brightness calculation unit 24, a synthesis calculation unit 26, and a coordinate conversion unit 28; an image display memory 16; a display unit 18 such as a CRT display; and memory buses 30.

The volume memory 12 is, for example, a bus memory capable of high speed data transfer in conformity with the specification proposed by Rambus Inc., details of which are disclosed in the following document (D).

(D) Norihiko NAONO, "Direct Rambus aims at main memory of personal computer in 1999 (First volume), (Latter volume)", NIKKEI ELECTRONICS, No. 708, pp. 139–152, 1998, No. 710, pp. 163–176, 1998.

The volume memory 12 stores, in the volume data-accumulating unit 12a, the volume data for representing a model in the three-dimensional space to be used as a processing objective, and it stores, in the synthesis calculation result-accumulating unit 12b, intermediate results of the calculation performed by the synthesis calculation unit 26 of the image processing unit 14.

Figure 2B:
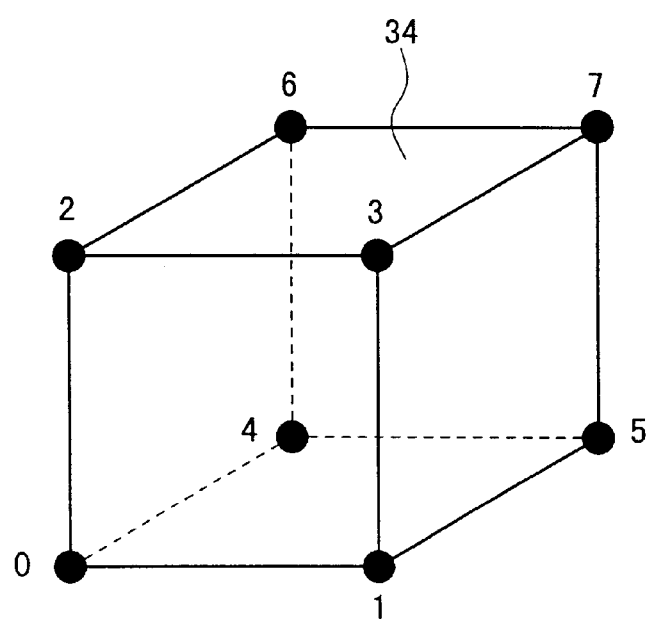
FIG. 2B shows the concept of the voxel based on the unit of small cube for constructing the volume data shown in FIG. 2A.

In the embodiment of the present invention, as shown in FIGS. 2A and 2B, eight voxels 0 to 7 for forming a small cube 34 are used as a unit to define the entire volume data 32 in the three-dimensional space. The entire volume data 32 is stored in the volume data-accumulating unit 12a, for which reading and writing are performed in conjunction with the image processing unit 14 in accordance with the control effected by the memory control unit 20.

According to this arrangement, the number of pieces of volume data which can be read at once is increased to improve the reading speed. Further, it is possible to read, in a small number of times, the data necessary for the inclination calculation performed in the inclination calculation unit 22 as described later on, making it unnecessary to accumulate the previous and subsequent volume data which would be otherwise necessary for the calculation.

An example of the volume data for constructing the model in the three-dimensional space in the present invention is the measurement data obtained by using an ultrasonic wave diagnosis apparatus used in the medical field. This apparatus is used such that the ultrasonic wave is applied to a living body, and information concerning the tissue in the living body is obtained from the reflected wave data to be accumulated in a three-dimensional manner so that an image is displayed to observe the situation of the tissue in the living body at various angles. The volume data in this example is, for instance, the density of the tissue in the living body. One piece of volume data (including the respective voxels 0 to 7 shown in FIG. 2B) is represented, for example, by 8-bit numeric data.

FIG. 3 conceptually shows the volume data stored in the volume memory 12. The voxels of all of the small cubes 34 constituted by the volume data, i.e., the respective pieces of 8-bit data of the respective eight voxels 0 to 7 are stored in the volume data-accumulating unit 12a which is connected via the memory bus 30 to the image processing unit 14, as indicated by memory elements 13a to 13n shown in FIG. 3.

Figure 4:
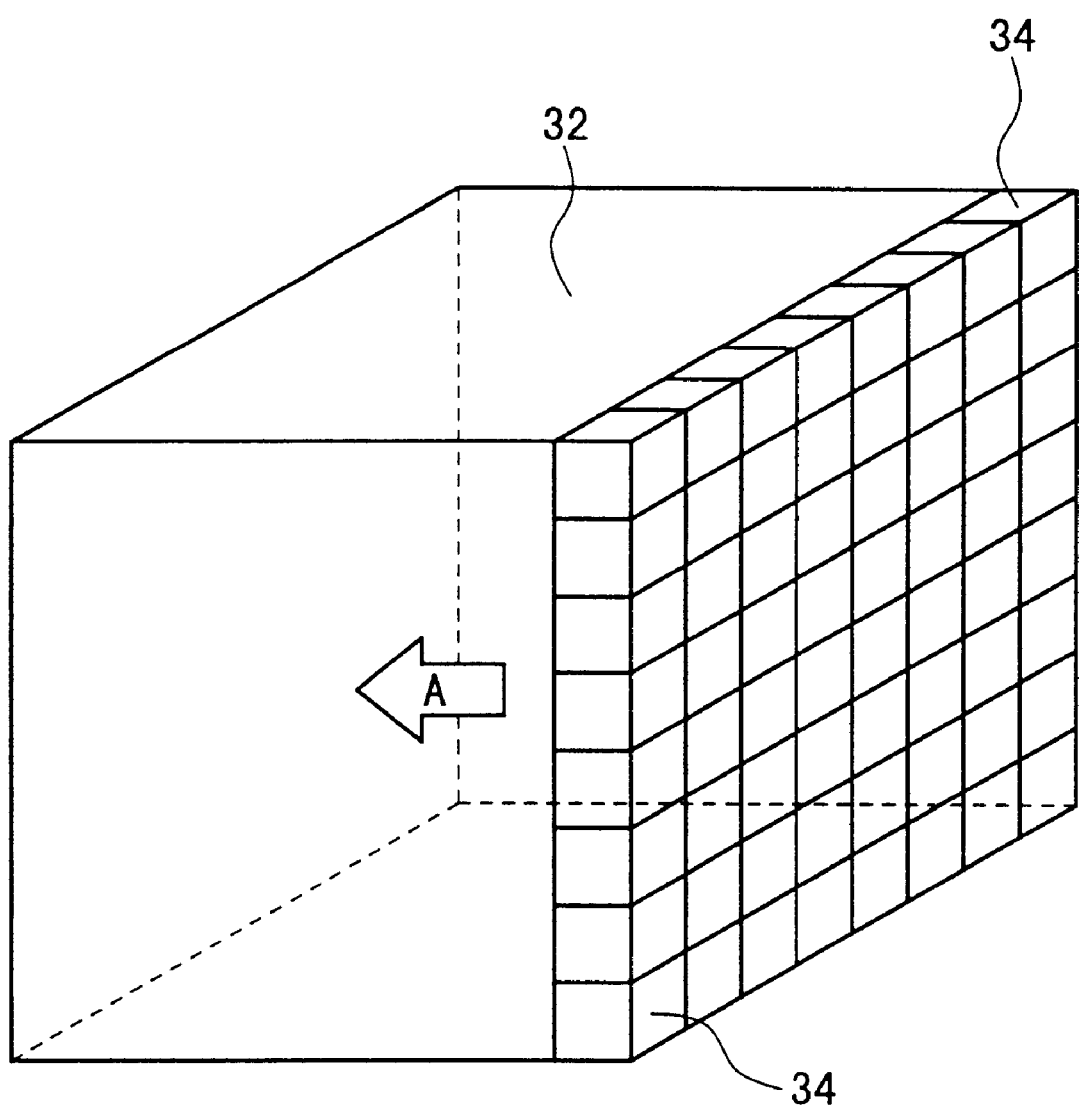
FIG. 4 illustrates the method for processing the volume data in accordance with the slice parallel process.

The calculation process, which is performed in the image processing unit 14 of the embodiment of the present invention, is effected by using the slice parallel process. The slice parallel process is the method performed as follows as shown in FIG. 4 for successively processing the volume data of the respective small cubes 34 for constituting the entire volume data 32, starting from the small cubes 34 concerning the forwardmost surface (right side in FIG. 4). That is, the data corresponding to one surface is processed, and the data corresponding to the next one surface is processed after completion of the process for the foregoing one surface. Thus, the data is successively processed for each surface in the direction indicated by the arrow A. In this procedure, the process for reading the voxel data from the volume data-accumulating unit 12a is performed in accordance with the control effected by the memory control unit 20.

Figure 5:
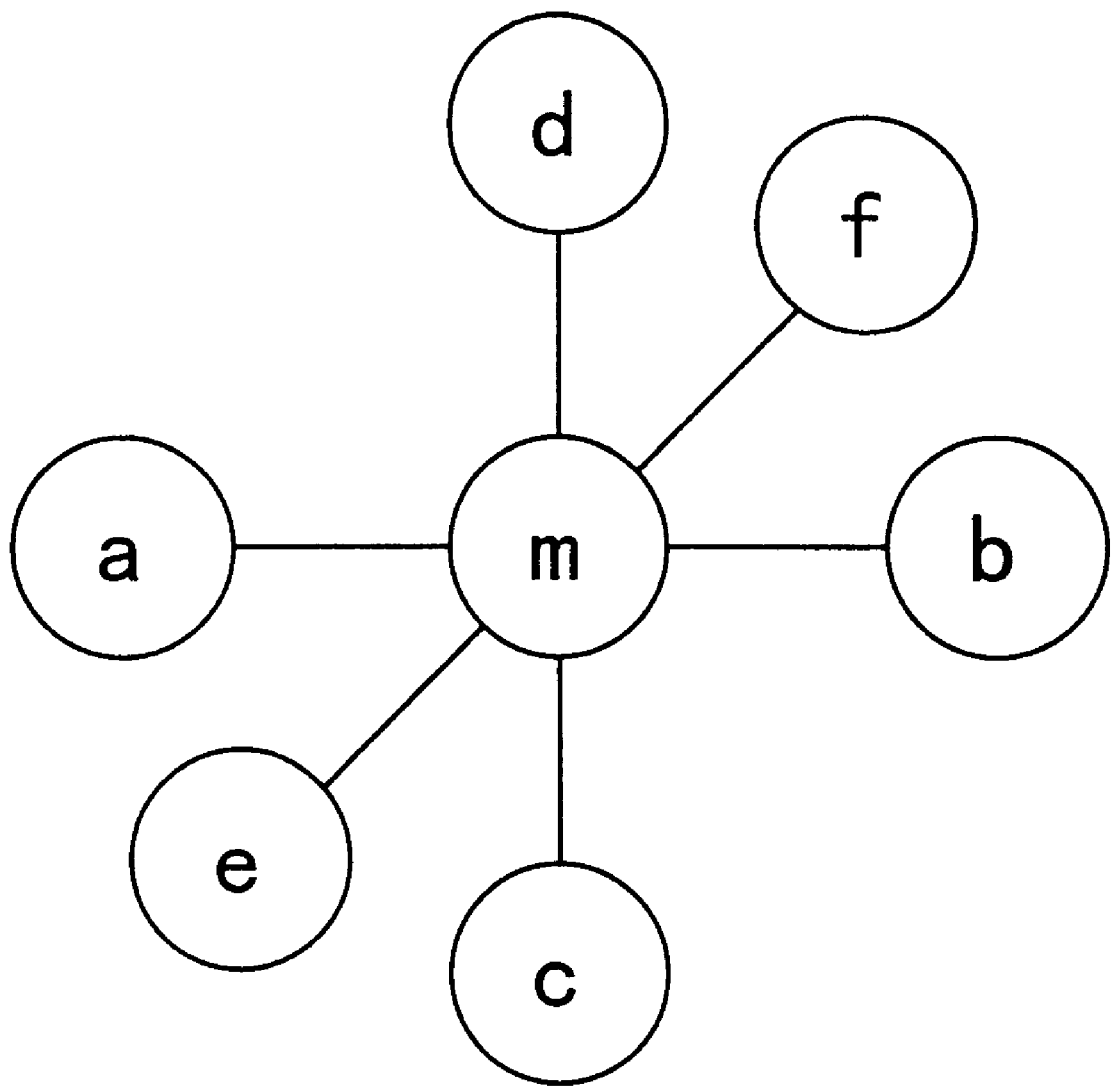
FIG. 5 illustrates the inclination calculation for the volume data performed in the inclination calculation unit.

In the inclination calculation unit 22, as shown in FIG. 5, assuming that the processing objective voxel is "m", the inclination calculation for determining the inclination of the image is performed by using the voxel "m" as a center, on the basis of the volume data concerning the voxel "e" disposed in front thereof, the voxel "f" disposed at the back thereof, the voxel "a" disposed at the left thereof, the voxel "b" disposed at the right thereof, the voxel "d" disposed upwardly, and the voxel "c" disposed downwardly.

When the data processing is performed in the inclination calculation in accordance with the slice parallel process described above, the left and right voxels "a", "b" are disposed just adjacent to the voxel "m" as the processing objective. However, the upward and downward voxels "d", "c" correspond to the data stored previously or subsequently by an amount of one beam (one piece in the lateral direction) with respect to the voxel "m", and the front and back voxels "e", "f" correspond to the data stored previously or subsequently by an amount of one slice (one surface) with respect to the voxel "m". Therefore, if the process for reading the volume data from the memory is constructed such that the data array concerning each flat surface is read one surface by one surface, it is necessary to store the data corresponding to the two surfaces disposed at the front and the back, in addition to the data for the surface including the voxel "m" as the processing objective, in order to perform the inclination calculation performed in the inclination calculation unit 22.

In the image synthesis system 10 according to the embodiment of the present invention, the volume data is divided to have the data structure in which the small cube 34 is used as the unit comprising the eight voxels 0 to 7. Further, the bus memory capable of high speed data transfer is used as the volume memory 12. Accordingly, as understood from the following explanation, it is unnecessary to provide the memory for storing the data corresponding to the two surfaces disposed at the front and the back, in order to perform the inclination calculation in accordance with the slice parallel process.

Figure 6A:
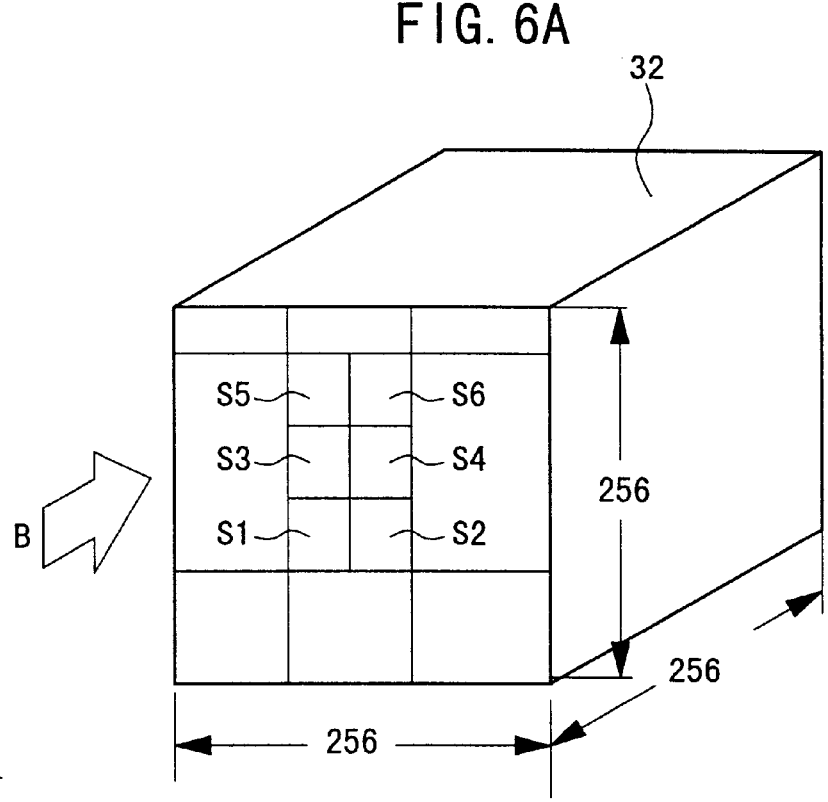
FIG. 6A shows an arrangement of the volume data comprising units each of which is composed of a small cube for the volume data.
Figure 6B:
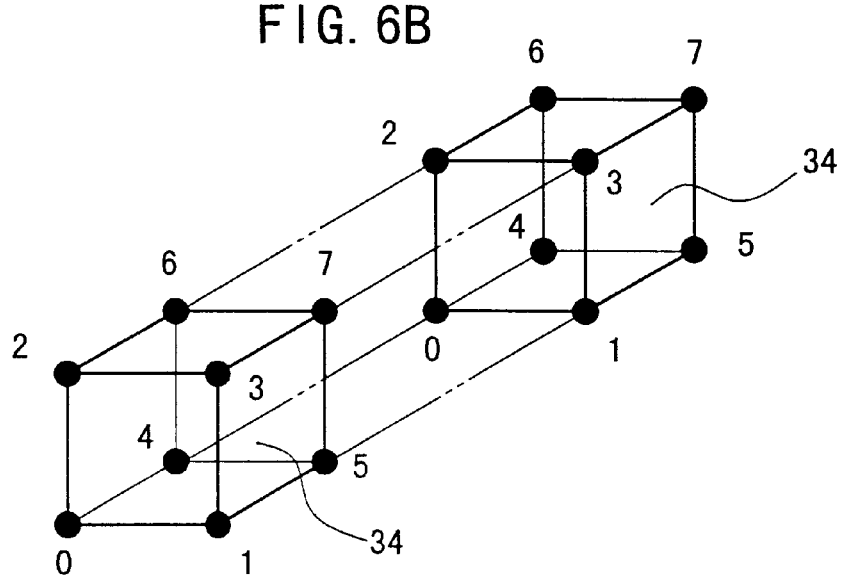
FIG. 6B shows an array of eight voxels of each small cube shown in FIG. 6A.

FIGS. 6A and 6B show the arrangement of the volume data comprising the units of small cubes S1 to S6 concerning the entire volume data 32. As shown in FIG. 6B, each of the small cubes S1 to S6 shown in FIG. 6A comprises the unit of eight voxels 0 to 7 for constructing one small cube 34, which is arranged continuously in the depth direction. The small cubes S1 to S6 are arranged and accumulated in the direction of the line of sight indicated by the arrow B shown in FIG. 6A, in the volume data-accumulating unit 12a of the volume memory 12 so that the cubic data (which refers to the data comprising the units each of which is composed of the eight voxels 0 to 7 for constituting the small cube S1) may be read continuously from the entire volume data 32.

That is, the volume data in the embodiment of the present invention comprises, for example, 256 pieces in the vertical, lateral, and depth directions respectively, i.e., 256×256×256 pieces of volume data in total, and it is read by using the unit of the cubic data (eight voxels 0 to 7) represented by each of the small cubes S1 to S6.

Figure 7:
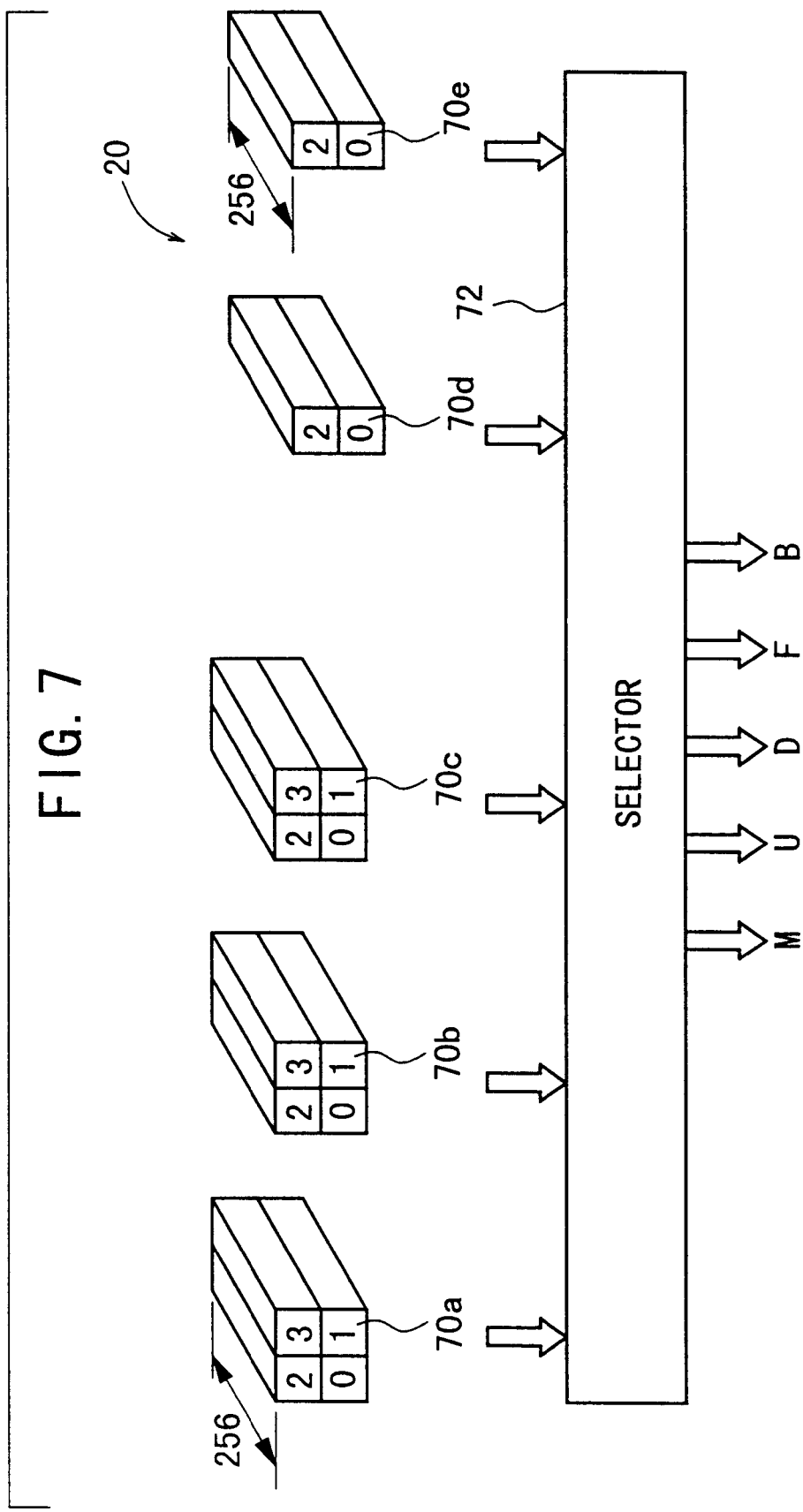
FIG. 7 shows an arrangement of the memory control unit of the image processing unit.

FIG. 7 shows an arrangement of the memory control unit 20 of the image processing unit 14. The memory control unit 20 has registers 70a to 70e and a selector 72. When the volume rendering is started, then the cubic data corresponding to one lateral array is firstly read from the volume data-accumulating unit 12a of the volume memory 12, and the data is stored in any of the registers 70a to 70e shown in FIG. 7.

The volume data read from the volume memory 12 is stored in any of the registers 70a to 70e. The destination of the storage is controlled based on the use of a general sequencer so that the reading of the volume data from the registers 70a to 70e to the inclination calculation unit 22 is not competed with the writing from the volume memory 12 to the registers 70a to 70e.

Each of the registers 70a to 70e is able to store 256 pieces of volume data in the depth direction, i.e., the volume data arranged as shown in FIG. 6B. Further, the following arrangement is given. That is, the volume data of 4×256 pieces, which is all of the cubic data including the voxels 0 to 7, can be stored in the registers 70a to 70c. The volume data of 2×256 pieces, which corresponds to any two of 0, 2, 4, 6 or 1, 3, 5, 7 disposed on one side of the cubic data, can be stored in the registers 70d, 70e.

In the case of the embodiment of the present invention, each of the registers 70a to 70e is constructed to store pieces of the volume data of 256/number of ASIC's concerning the actual depth, because the image processing unit 14 comprises a plurality of ASIC's, and the plurality of ASIC's are simultaneously operated as described later on.

The data is processed by using the unit of the cubic data during the process performed over a range from the volume memory 12 in which the volume data is accumulated to the memory control unit 20 of the image processing unit 14. At the stage at which the data is read to the memory control unit 20, the cubic data is decomposed into the volume data. In the process performed thereafter, the calculation process is performed by using the unit comprising the adjoining voxels necessary for the inclination calculation on the basis of the central voxel "m" in the inclination calculation. The process is successively performed in accordance with the slice parallel procedure.

That is, when the volume data is read from the volume memory 12 via the memory bus 30 (high speed data transfer bus), and the data is stored in the registers 70a to 70e, then the memory control unit 20 selects the volume data to be necessary in the inclination calculation unit 22 from the selectors 72 shown in FIG. 7 to supply the data to the inclination calculation unit 22.

In this process, the registers 70a to 70e make output by the aid of the selector 72 while making allotment to the small cube M to serve as the center for the inclination calculation, the upward small cube U, the downward small cube D, the frontward small cube F, and the backward small cube B which are adjacent to the small cube M respectively.

Figure 8B:
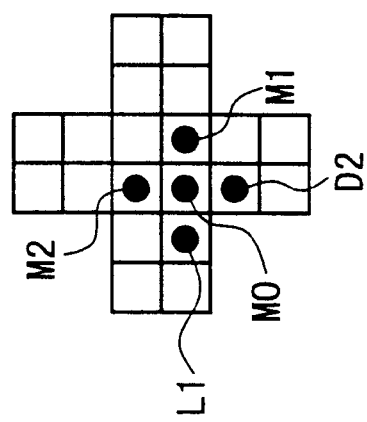
Figure 8A:
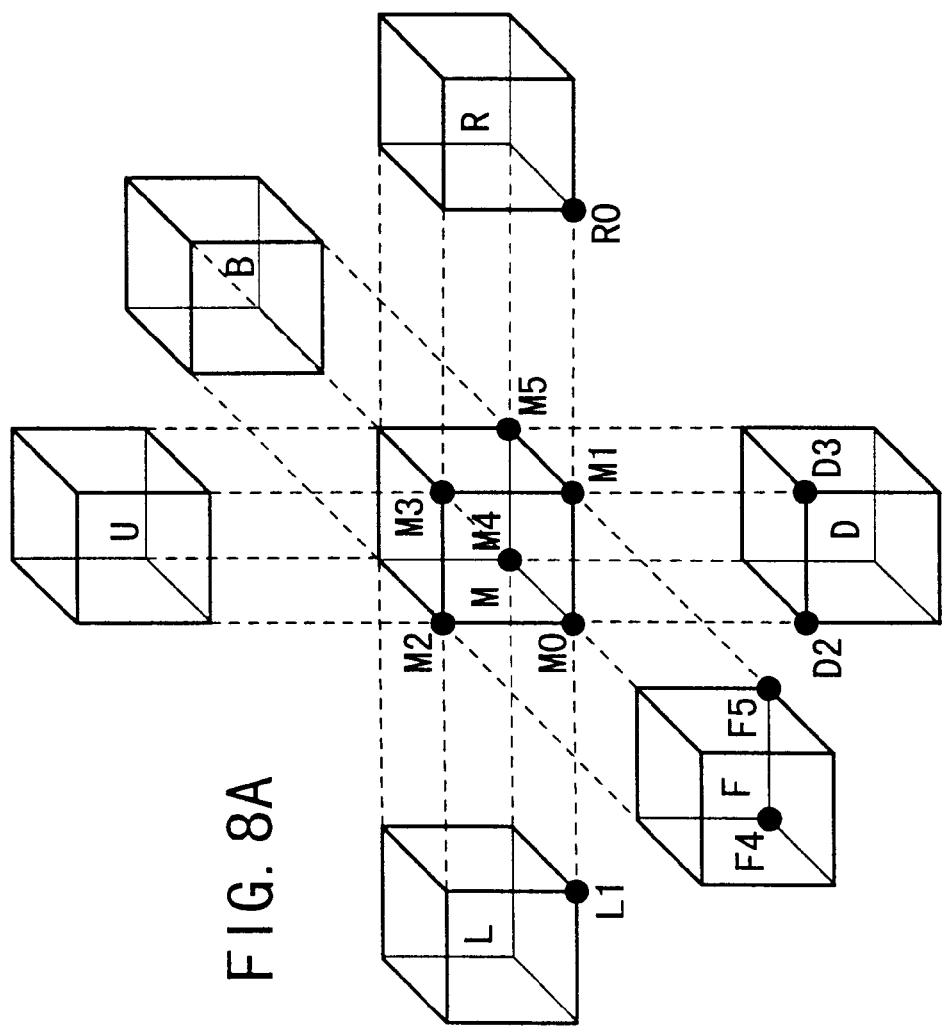
Figure 9A:
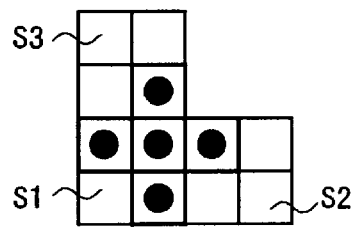
FIGS. 9A to 9H show schematic illustrations depicting the situation in which the volume data necessary for the inclination calculation is processed in a slice parallel manner.
Figure 9E:
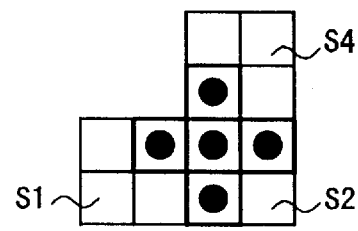
Figure 9B:
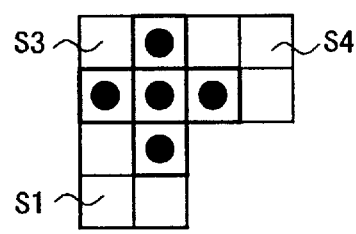
Figure 9F:
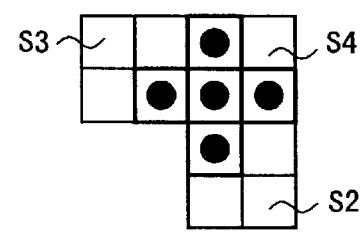
Figure 9C:
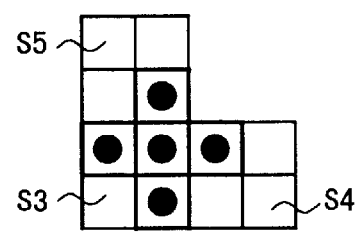
Figure 9G:
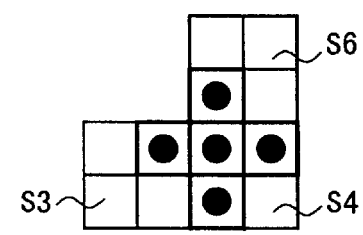
Figure 9D:
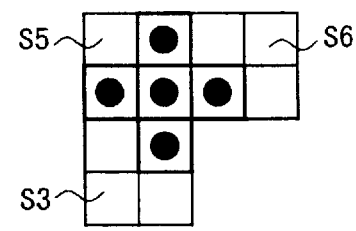
Figure 9H:
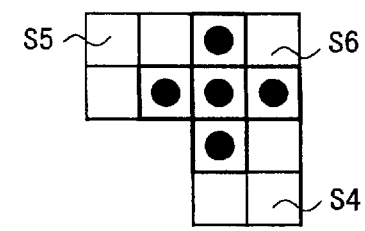

FIGS. 8A and 8B show the relationship between the central small cube M necessary for the inclination calculation and the small cubes U, D, F, B adjacent thereto. FIG. 8A shows a perspective view, and FIG. 8B shows a front view. Adjoining voxels, which are necessary for the calculation when the central voxel in the inclination calculation is M1 and M0, are indicated by solid circles. R and L indicate the small cubes which are disposed on the right and left sides of the central small cube M respectively.

When the central voxel for the inclination calculation is M0 or M1, it is necessary for the calculation to use the respective volume data concerning the adjoining voxels D2, D3 for the small cube D disposed on the downward side of the central voxel, the adjoining voxels F4, F5 for the small cube F disposed on the front side, and the adjoining voxels L1, R0 for the small cube L disposed on the left side or the small cube R disposed on the right side. When the central voxel for the inclination calculation is any one of M2 to M7 other than M0 or M1, it is also necessary for the inclination calculation to use the respective voxels in the small cubes M, U, D, F, B adjacent to each of the central voxels. The necessary data is supplied from the respective registers 70a to 70e to the inclination calculation unit 22.

FIGS. 9A to 9H schematically illustrate the situations in which the volume data necessary for the inclination calculation is processed in accordance with the slice parallel procedure. FIGS. 9A to 9H are illustrative of the case based on the use of the small cubes S1 to S6 shown in FIGS. 6A and 6B, and they show front views in which the central voxel for the inclination calculation and the adjoining voxels necessary for the inclination calculation, i.e., the upward, downward, right, and left voxels adjacent to the central voxel are depicted by solid circles. The direction of the inclination calculation process is in the order of FIG. 9A to FIG. 9H.

The central voxel for the inclination calculation is moved upwardly by every one voxel every time when the inclination calculation performed by using the center is completed for the process for those arranged in the depth direction with respect to the plane of paper of FIGS. 9A to 9H. According to FIGS. 9A to 9H, it is easily understood that the next inclination calculation process can be performed by newly reading the cubic data corresponding to one lateral array from the volume data-accumulating unit 12a every time when the central voxel for the inclination calculation process is moved upwardly by one. That is, it is demonstrated that the cubic data corresponding to the next one lateral array necessary for the next inclination calculation process is successfully read from the volume data-accumulating unit 12a during the period in which the inclination calculation process is performed for the data corresponding to the previous one lateral array.

Figure 10:
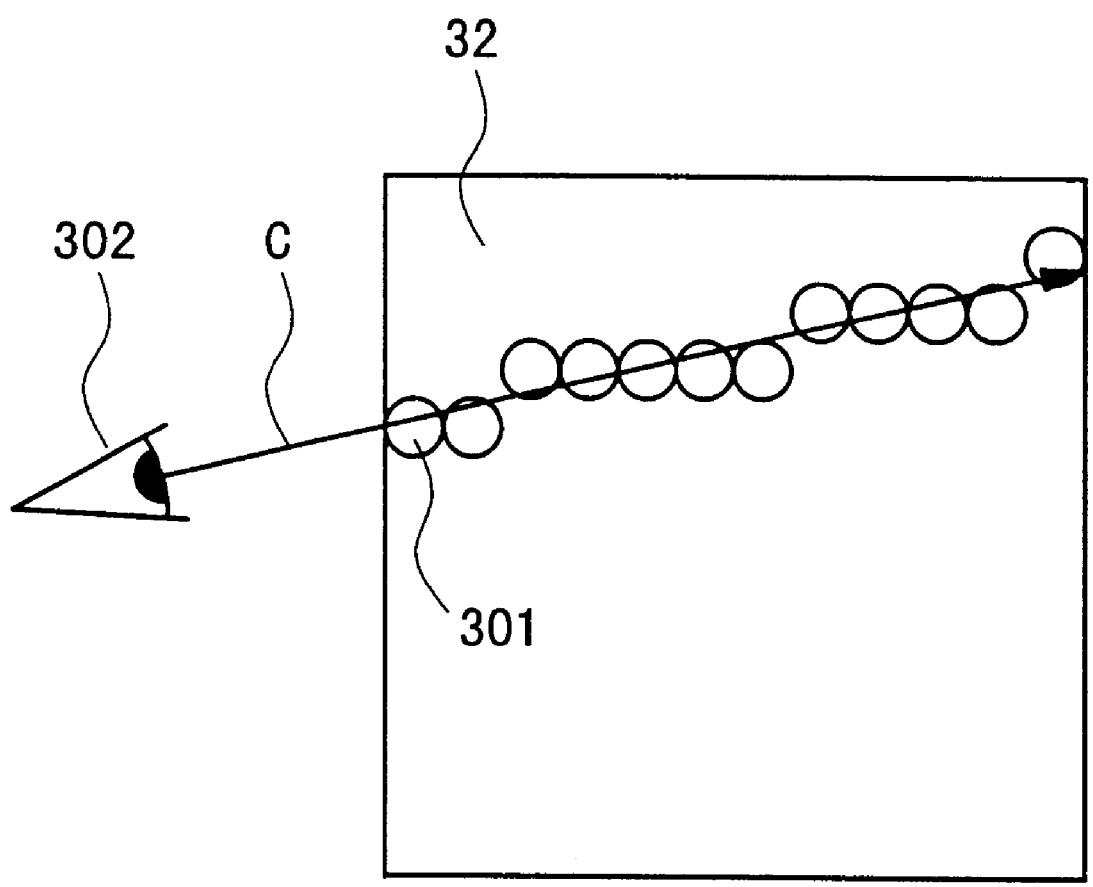
FIG. 10 shows a schematic illustration for explaining the synthesis calculation process in accordance with the ray casting method.

The results of calculation obtained by the inclination calculation unit 22 are fed to the brightness calculation unit 24 in which the brightness data corresponding to the calculation results is calculated to be supplied to the synthesis calculation unit 26. As schematically shown in FIG. 10, the volume rendering in accordance with the ray casting method is effected such that the voxels 301, which are disposed along the line of sight C generated from the point of sight 302 (through which the line of sight C passes), are subjected to the synthesis calculation in the entire volume data 32. In FIG. 10, open circles represent only the voxels 302 through which the line of sight C passes.

In the synthesis calculation process, the result of brightness calculation is accumulated one by one for each of the voxels 301 through which the line of sight C passes. The synthesis calculation results, which have been obtained for those up to the previous voxel 301, are accumulated in the synthesis calculation result-accumulating unit 12b. The calculation result, which is necessary for the synthesis calculation, is read depending on the direction of the line of sight C.

Figure 11A:
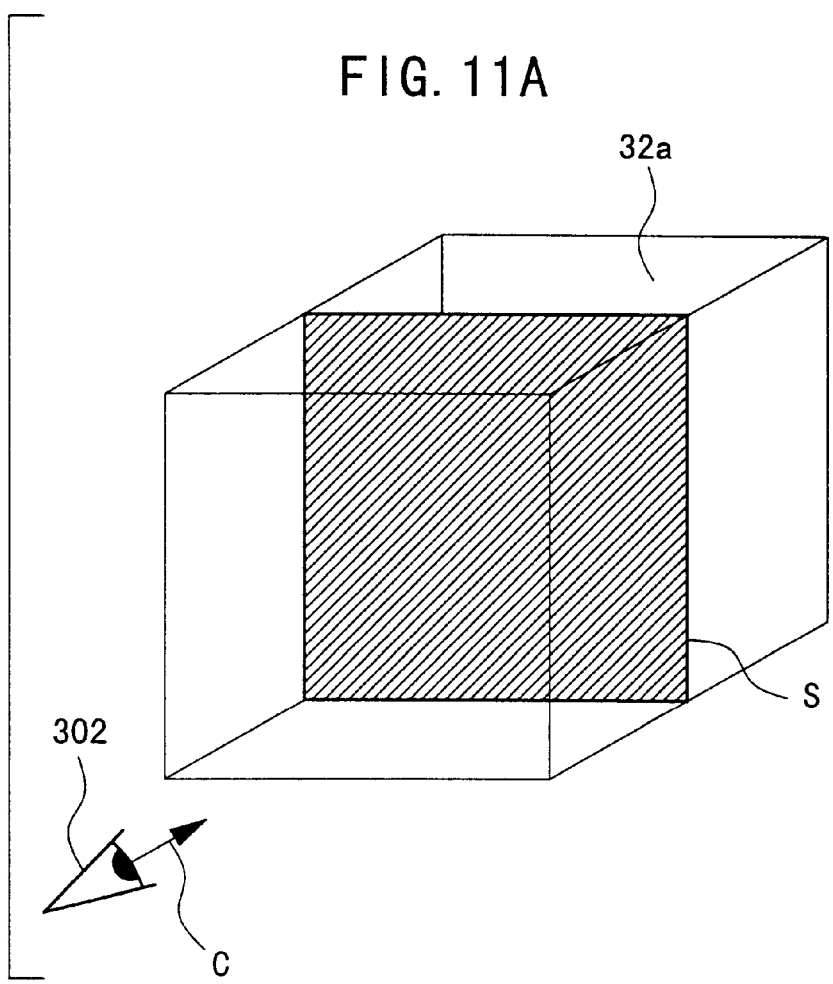
Figure 11B:
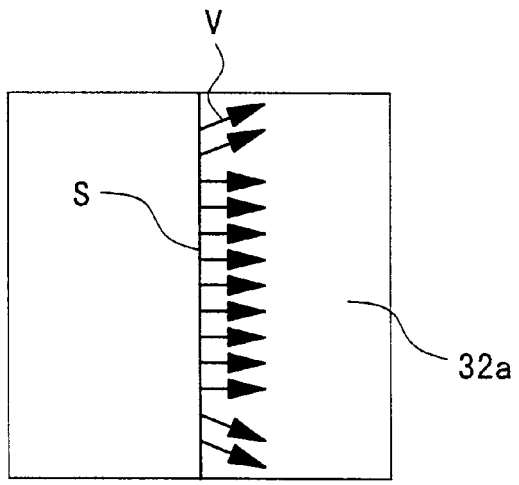
Figure 12A:
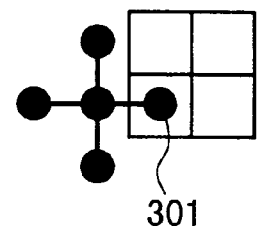
Figure 12B:
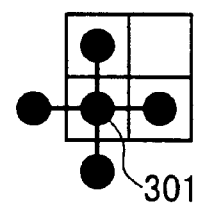
Figure 12C:
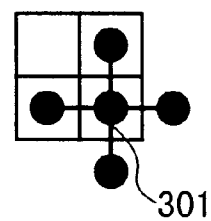
Figure 12D:
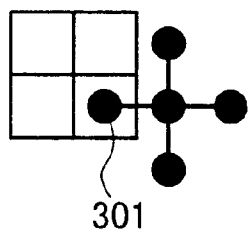

That is, as shown in a perspective view illustrated in FIG. 11A, the calculation is started from the slice surface which is near to the point of sight 302, included in the entire volume data 32. The surfaces disposed at the deeper positions are successively subjected to the calculation. However, the synthesis calculation performed in the synthesis calculation unit 26 is the process for calculating the accumulation of the voxels through which the line of sight 302 has already passed.

Therefore, the synthesis calculation unit 26 is operated such that if the slice surface for the entire volume data 32 which is being processed is the surface S shown in FIG. 11A, a group of vectors V, which indicate the next destination of the synthesis calculation, are determined in accordance with the result of the accumulation calculation up to the surface S. As described above, in order to perform the synthesis calculation process for the certain surface S included in the entire volume data 32, it is necessary to provide the accumulation calculation result up to the previous surface.

Accordingly, in the synthesis calculation unit 26 concerning the embodiment of the present invention, the synthesis calculation result of the specified surface S included in the entire volume data 32 is stored in the synthesis calculation result-accumulating unit 12b of the volume memory 12. The stored result of the synthesis calculation is read in the synthesis calculation process for the next surface to successively perform the accumulation calculation.

In this embodiment, the image processing unit 14 (ASIC), which comprises, for example, the inclination calculation unit 22, the brightness calculation unit 24, and the synthesis calculation unit 26, has the structure capable of the pipeline processing. The processing ability of the volume memory 12 is about four times the ability of the pipeline processing of the image processing unit 14.

Accordingly, owing to the pipeline processing effected by the image processing unit 14, those which can be allotted to the volume memory 12 during the period in which the voxels corresponding to one lateral array of the volume data are processed include three processes of (a) reading the next volume data corresponding to one lateral array, (b) reading the synthesis calculation result, and (c) save-writing the synthesis calculation result. Therefore, even in the case of the structure in which the volume data-accumulating unit 12a and the synthesis calculation result-accumulating unit 12b are externally equipped, it is possible to execute the pipeline operation of the image processing unit 14 without taking any break.

In the memory control method according to the embodiment of the present invention, as shown in FIGS. 12A to 12D, the same voxel 301 is used in the inclination calculation four times for the back surface, the central front side, the central back side, and the front surface. No memory is provided in the image processing unit 14. Therefore, it is necessary to read the same data from the volume data-accumulating unit 12a of the volume memory 12 at each time. However, this process can be performed owing to the realization of the high speed memory cycle by adopting the high speed data transfer bus. Thus, it is unnecessary to use the memory in the image processing unit 14.

Next, explanation will be made for details of the construction of the entire volume data 32, the volume memory 12, and the image processing unit 14 (ASIC).

FIG. 13 shows the connected arrangement of the volume memory 12 and the image processing unit 14 (ASIC). Two memory buses 30 are connected to the respective memory elements 13a to 13n and the ASIC 0 to ASIC 7 for constructing the image processing unit 14 respectively. The number of processing pipelines per one ASIC is four. Eight ASIC's are arranged to make simultaneous operation. Therefore, thirty-two types of parallel processing are performed, and the memory buses 30 are operated in parallel as those corresponding to sixteen.

Figure 14A:
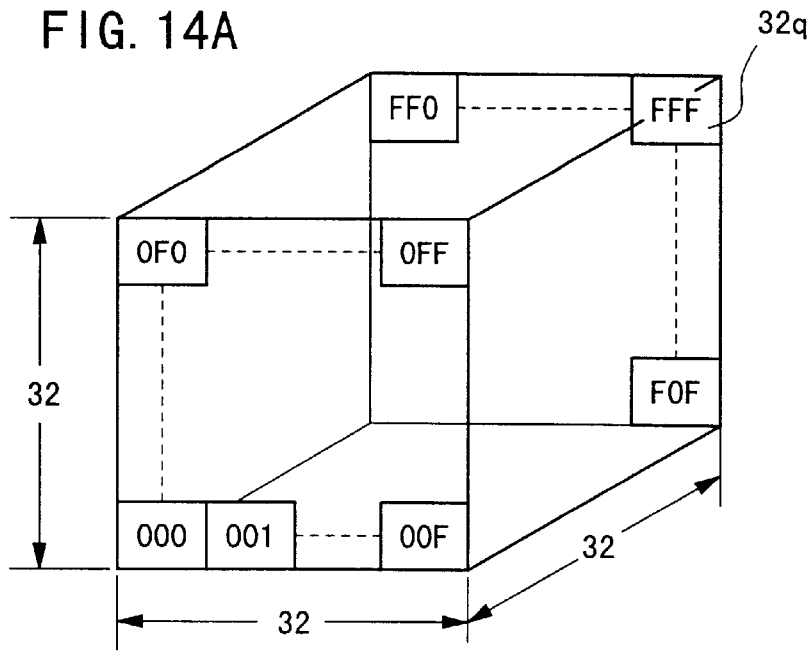
FIGS. 14A and 14B shows the arrangement of the volume data, wherein FIG. 14A illustrate the volume data of 32×32× 32.
Figure 14B:
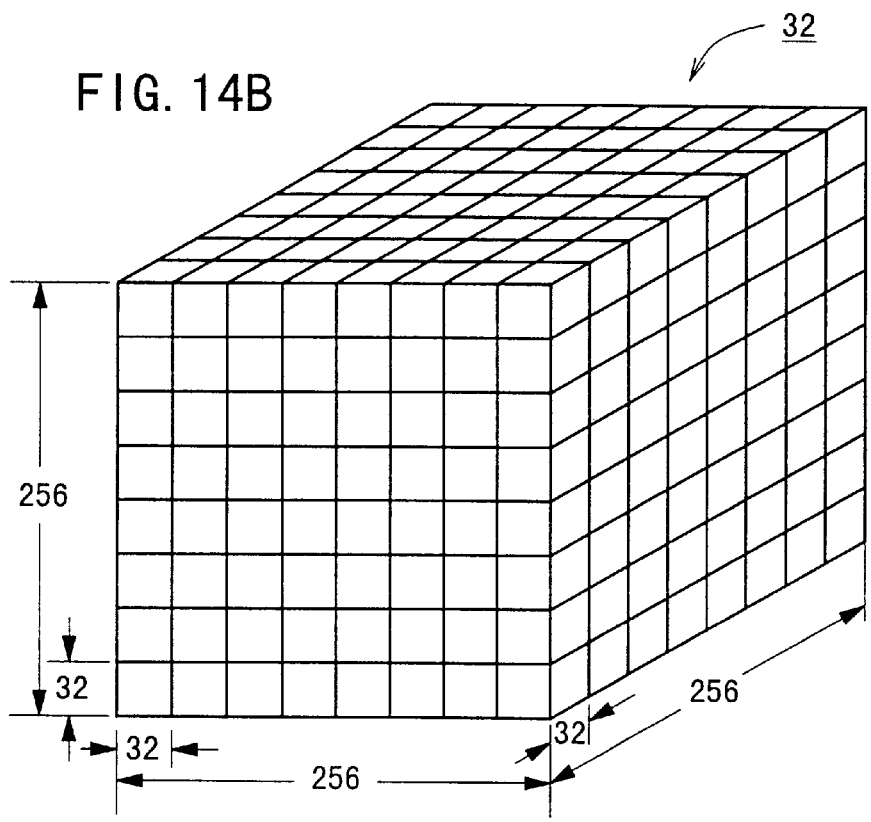

As described above, the entire volume data 32 comprises 256 individuals in the vertical, lateral, and depth directions respectively, i.e., 256×256×256 voxels in total. The voxels are constructed by 512 (8×8×8) pieces of data using a unit of volume 32q of 32×32×32 as shown in FIG. 14A, which are accumulated in the volume memory 12 as the entire volume data 32 shown in FIG. 14B.

With reference to FIG. 13, the numerals of 000 to FF1 in the memory elements 13a to 13n represent the volume data of the small cube 34 composed of eight voxels, i.e., the use cubic data. As indicated by the numerals of 000 to FF1, the cubic data is skewed and accumulated in the volume memory 12.

In this embodiment, the data is skewed at the inside of the volume 32q to be accumulated. However, the data is not skewed for the volume group 32q for constructing the entire volume data 32 of 256×256×256. The eight of ASIC 0 to ASIC 7 for constructing the image processing unit 14 are operated such that 32 voxels are simultaneously read and processed in the order starting from the lower-left position of the volume data. Therefore, the read data is skewed. However, the reading address during this process is the same for all ASIC's.

It is assumed that the data (Data) is represented by a combination of ix, iy, iz corresponding to the respective low order 4-bit addresses, i.e., Data=[ix, iy, iz] provided that the coordinates of the original volume data are x, y, z. The memory bus 30 of the sixteen memory buses 30, to which a certain piece of data is accommodated, is determined by the following expression provided that the memory bus channel number is k.

$$k=(x+y+z)\bmod 16 \text{ (remainder obtained by dividing ``}x+y+z\text{'' by 16)}$$

The addresses of the memory bus channels, which are given to the respective sixteen memory buses depending on the direction of the principal axis when the volume rendering is executed, are represented by the following expressions.

Z principal axis: iz=Z, iy=Y, ix=(k−z−y+32)mod16

Y principal axis: iz=(k−x−y+32)mod16, iy=Y, ix=X

X principal axis: iz=Z, iy=(k−x−z+32)mod16, ix=X

As described above, even when the principal axis is changed, it is possible to simultaneously obtain the volume data aligned in the lateral direction. The reading of the volume data when the principal axis is changed is exemplarily shown in FIG. 15. In FIG. 15, k represents the memory bus channel number of the sixteen memory buses 30.

The calculation result, which is obtained by the synthesis calculation performed by the synthesis calculation unit 26 as described above, is subjected to the coordinate conversion performed by the coordinate conversion unit 28 to make output to the image display memory 16. The display unit 18 can display an objective image on its display section in accordance with the image data accumulated in the image display memory 16.

Next, as shown in FIG. 16, the volume memory 12 for accumulating the entire volume data 32 is allowed to have a structure of 512×512×1024. Two channels of the memory buses 30 are connected to eight parallel ASIC's. Six memories (DRAM) of 18 Mbit are connected to the respective memory bus channels to accumulate the entire volume data 32. In this case, the address map is exemplarily illustrated as shown in FIGS. 17A to 17C.

In FIGS. 17A to 17C, respective addresses are represented by CS for the chip select for DRAM, B for the bank select in DRAM, C for the column, R for the row, PS for the selection of ASIC, and P for the data selection in the packet, and X, Y, Z represent the coordinate system for the volume data.

In the case of the embodiment of the present invention, the volume data comprising the units of the cubic data is not skewed as described above. Therefore, as shown in FIG. 18, when the principal axis is changed depending on the direction of the line of sight during the reading process for the volume data, it is necessary to perform the process for rotating the small cube 34 to change the correspondence of the data read to the memory control unit 20 of the image processing unit 14.

Next, a second embodiment of the image synthesis system according to the present invention will be explained.

Figure 19:
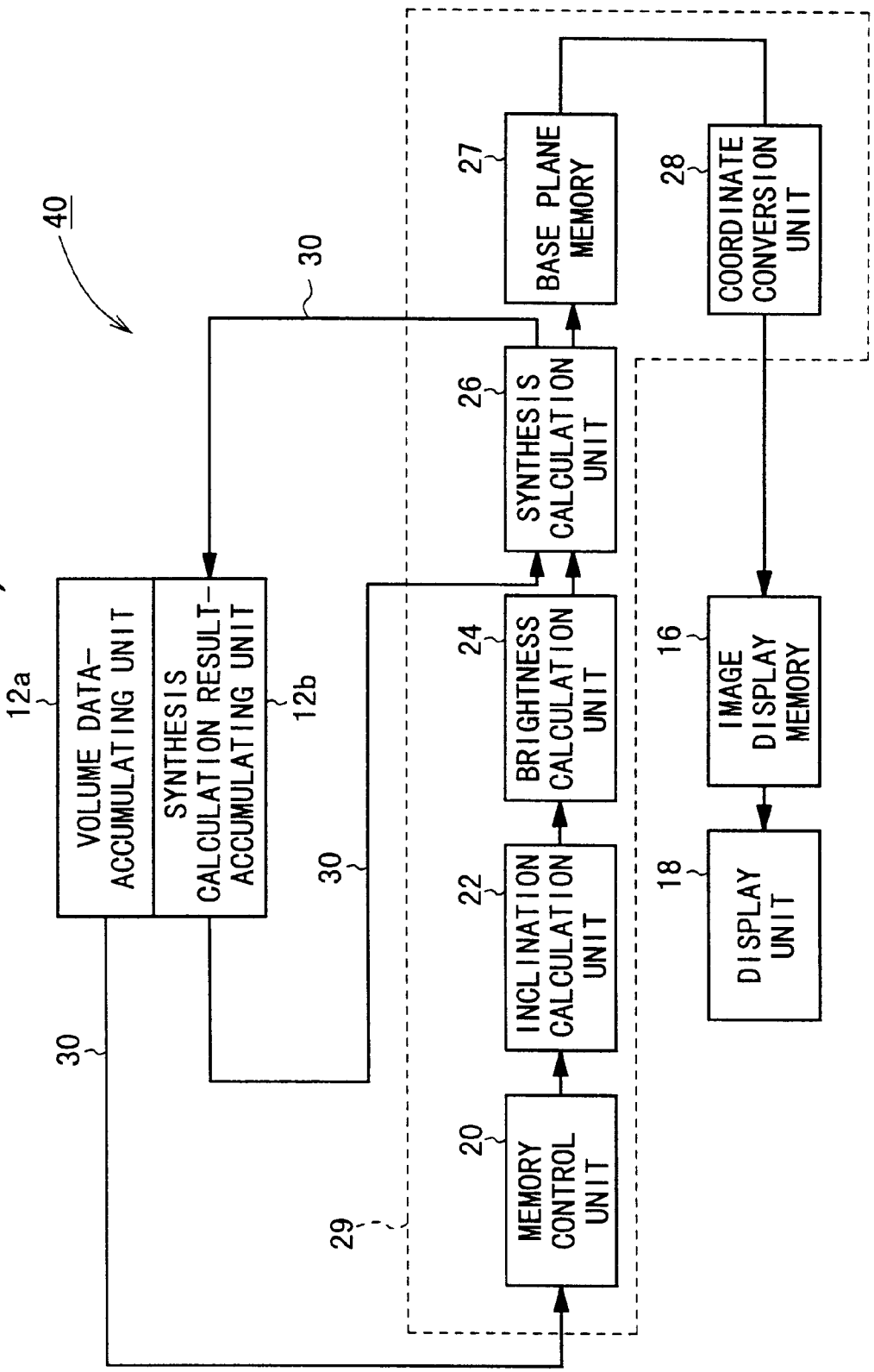
FIG. 19 shows a schematic arrangement of an image synthesis system concerning a second embodiment to carry out the three-dimensional volume rendering according to the present invention.

FIG. 19 schematically shows an arrangement of an image synthesis system 40 for carrying out the three-dimensional volume rendering according to the second embodiment.

The image synthesis system 40 according to this embodiment comprises an image processing unit 29 including a base plane memory 27 arranged between the synthesis calculation unit 26 and the coordinate conversion unit 28 of the image processing unit 14 shown in FIG. 1. The other constitutive components or parts are the same as those of the image synthesis system 10 shown in FIG. 1.

As explained in the first embodiment, when the ray casting method is used, the following method is adopted. That is, the ray (line of sight), which passes through the respective cells, is generated from the point of sight (pixel) on the display screen (projection surface) of the display, and the data of the voxels for constructing the volume data is integrated along the ray.

FIGS. 20A and 20B show the processing concept in which the volume data 32 is visualized in accordance with the method as described above. FIG. 20A shows a top view in which the parallel projection from the projection surface P is viewed from an upward position. FIG. 20B shows a side view in which the parallel projection from the projection surface P is viewed from a side position.

The inclination calculation, the brightness calculation, and the synthesis calculation are successively performed by the aid of the image processing unit 29 on the basis of the data of the respective voxels (respective voxels through which the line of sight C passes) in the volume data 32 along the line of sight C extending from the projection surface P. In the parallel projection, the line of sight C cannot proceed any more at the three surfaces as the exits of the line of sight C (the upper surface 3a, the side surface 3b, and the deep surface 3c in the example shown in FIGS. 20A and 20B, the surfaces are being referred to as "base planes" 3a to 3c). The synthesis calculation results are accumulated in the base plane memory 27.

The coordinate conversion unit 28 reads the contents of the base plane memory 27 to perform the coordinate conversion into those corresponding to the projection surface P. During this process, the coordinate conversion unit 28 determines the data of the synthesis calculation results for the corresponding places in the base plane memory 27 by following the line of sight C from the side of the projection surface P. Therefore, the coordinate conversion process cannot be started unless the synthesis calculation is completed for all of the points on the base plane, and the accumulation of the calculation results into the base plane memory 27 is completed.

Therefore, it is necessary for the base plane memory 27 to have an enough capacity to accumulate the data of all of the synthesis calculation results concerning the three surfaces (the upper surface 3a, the side surface 3b, and the deep surface 3c). It is indispensable to use the base plane memory 27 having a capacity capable of performing operation processing while dealing with a large amount of volume data at once.

When it is considered in this process to realize the performance of the parallel concurrent operation of the coordinate conversion process and the process up to the execution of the synthesis calculation in the image processing unit 29 after reading the volume data from the volume memory 12, it is necessary that the base plane memory 27 is composed of a dual system (double buffer system).

For example, when the rendering process is performed for the volume data 32 comprising the voxels having one side of 512 of the three-dimensional lattice, it is necessary for the base plane memory 27 to use the memory having a capacity of 1.5 MB provided that the double buffer system is provided, because of 512×512×3 surfaces and the 8-bit voxels to be subjected to the synthesis calculation.

The base plane memory 27 having this capacity is to be mounted in the image processing unit 29. However, when it is intended to construct the image processing unit 29 by using the integrated circuits (ASIC), the provision of such a capacity is difficult for the present technical level considering, for example, the relationship with respect to the memory control unit 20, the inclination calculation unit 22, the brightness calculation unit 24, and the synthesis calculation unit 26 which are other circuits in ASIC.

Figure 21:
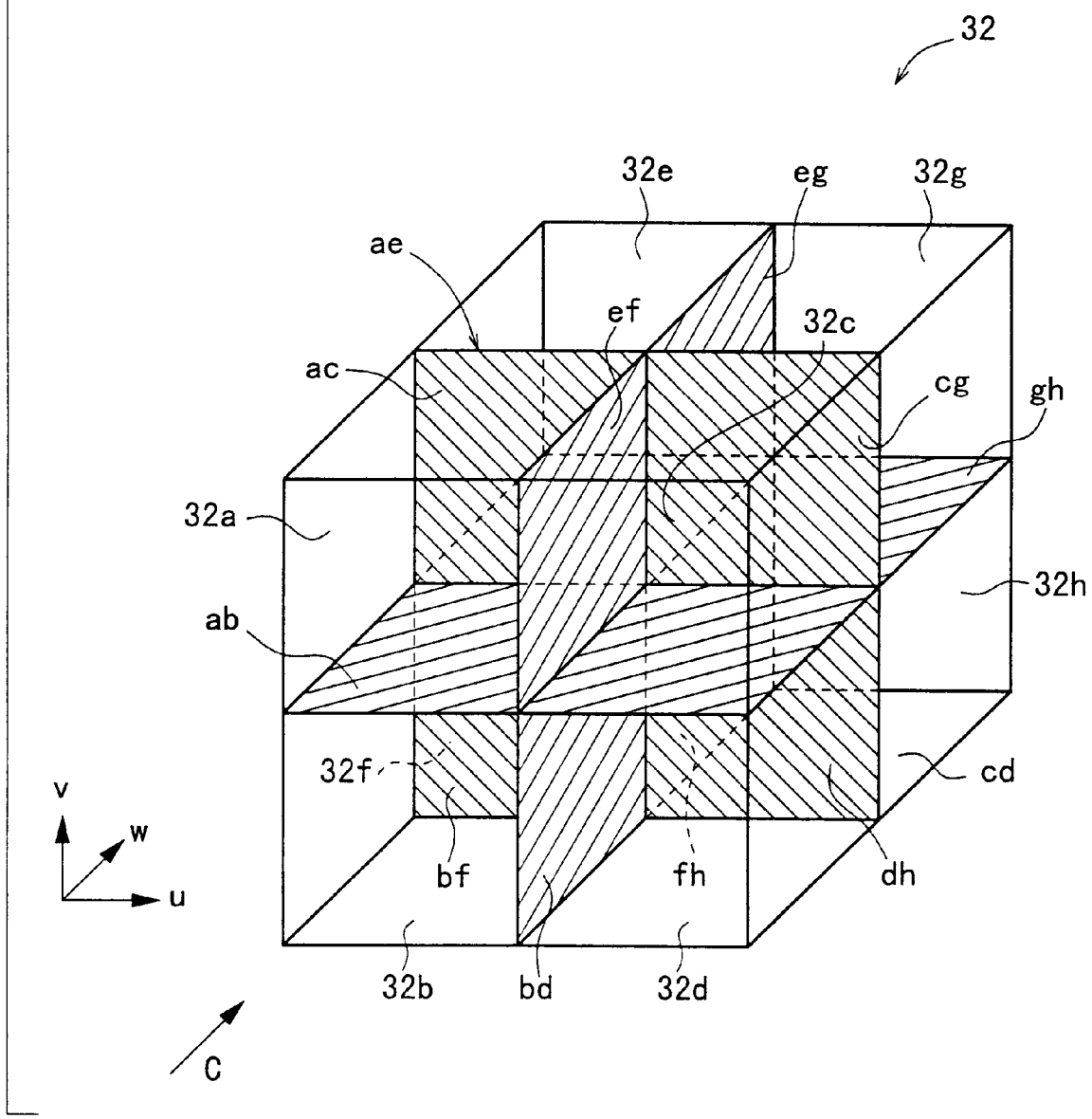
FIG. 21 shows the concept in which the entire volume data is divided into a plurality of pieces of volume data.

Accordingly, in the embodiment of the present invention, as shown in FIG. 21, the system is constructed such that the volume data 32 is divided into a plurality of pieces of volume data, i.e., eight pieces of volume data 32a to 32h in this embodiment to perform the operation processing for the rendering. In FIG. 21, symbols ab to gh indicate boundary surfaces of the divided pieces of volume data 32a to 32h respectively.

Figure 22:
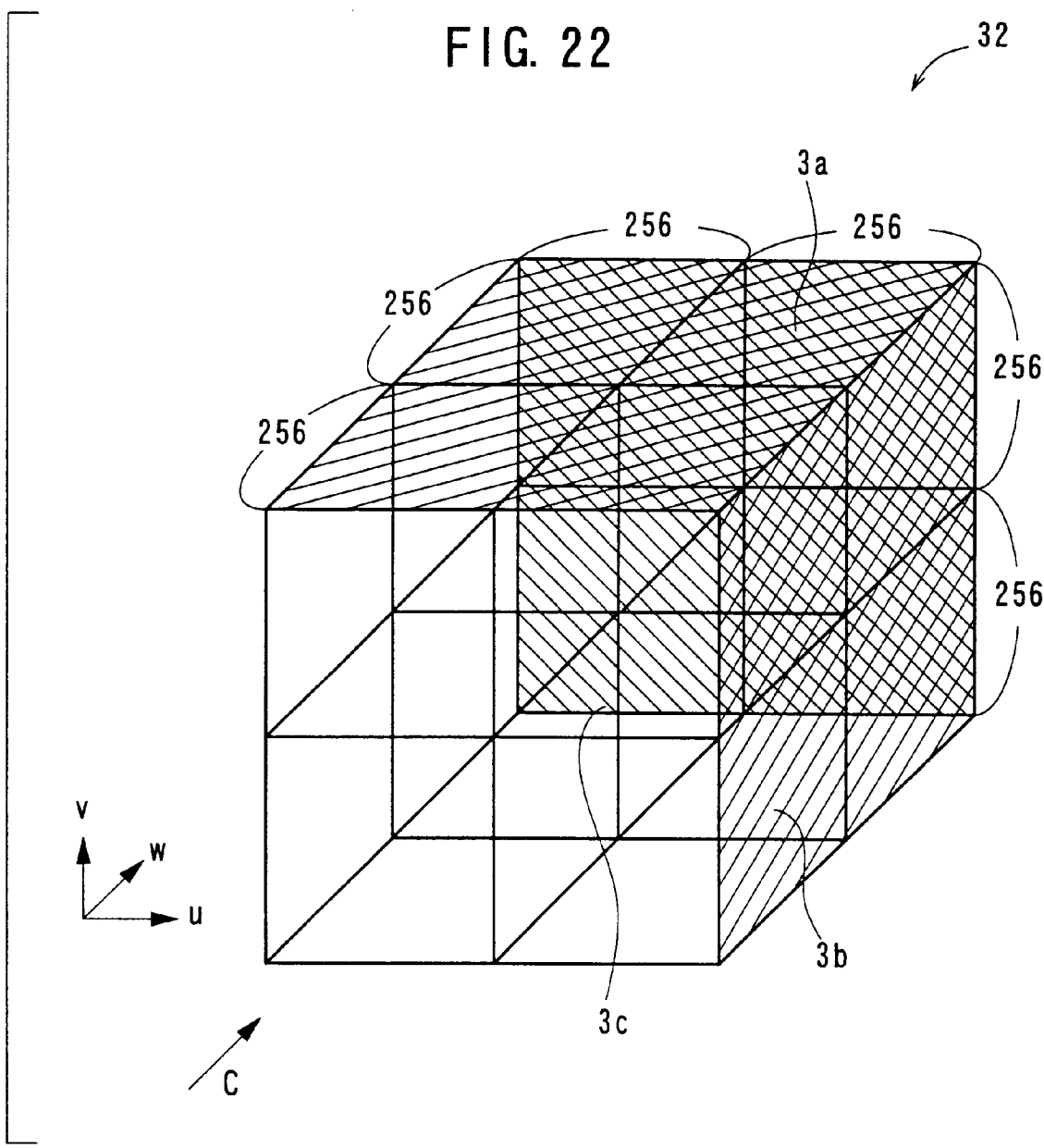
FIG. 22 shows the base plane in which the entire volume data is divided into a plurality of pieces of volume data.

FIG. 22 shows the base planes 3a, 3b, 3c obtained when the volume data 32 is divided into the eight pieces of volume data 32a to 32h. When viewed in the direction of the line of sight C, the base plane 3b corresponding to the lateral direction is defined to be in the "u" direction, the base plane 3a corresponding to the vertical direction is defined to be in the "v" direction, and the base plane 3c corresponding to the depth direction is defined to be in the "w" direction.

The size of the base plane memory 27 can be decreased by dividing the entire volume data 32 into the plurality of pieces of volume data 32a to 32h as described above. That is, as shown in FIG. 21, when the volume data 32 is divided into the eight pieces, each of the volume data 32a to 32h comprises the voxel having one side of 256, giving 256× 256×3 surfaces with the 8-bit voxel to be subjected to the synthesis calculation. Assuming that the double buffer system is provided, the capacity is 384 KB, and hence it is possible to make provision on ASIC.

When the entire volume data 32 is divided into the plurality of pieces to perform the visualization process, the process for the boundary surfaces ab to gh may cause a problem. As described above, in the volume rendering method, the voxels are followed along the line of sight C, and the brightness calculation values of the followed voxels are subjected to the synthesis calculation. Therefore, if the volume data 32 is divided, the synthesis calculation, which follows the line of sight C, is once intercepted by the boundary surfaces ab to gh.

Accordingly, in the embodiment of the present invention, the synthesis calculation results up to the boundary surfaces ab to gh, which are obtained for the rendering process for the specified divided volume data, are temporarily saved in the memory. When the synthesis calculation is started for the next divided volume data disposed ahead of the boundary surface ab to gh, the synthesis calculation results having been saved in the memory are read to be used as the initial value for the synthesis calculation for performing the rendering process. Accordingly, it is possible to obtain the continuity of the synthesis calculation at the boundary surfaces ab to gh when the volume data 32 is divided.

The memory for temporarily saving the synthesis calculation results up to the boundary surfaces ab to gh is the synthesis calculation result-accumulating unit 12b of the volume memory 12 as the high speed data transfer bus memory. It is considered that no circuit element is increased in the image processing unit 14.

Figure 23:
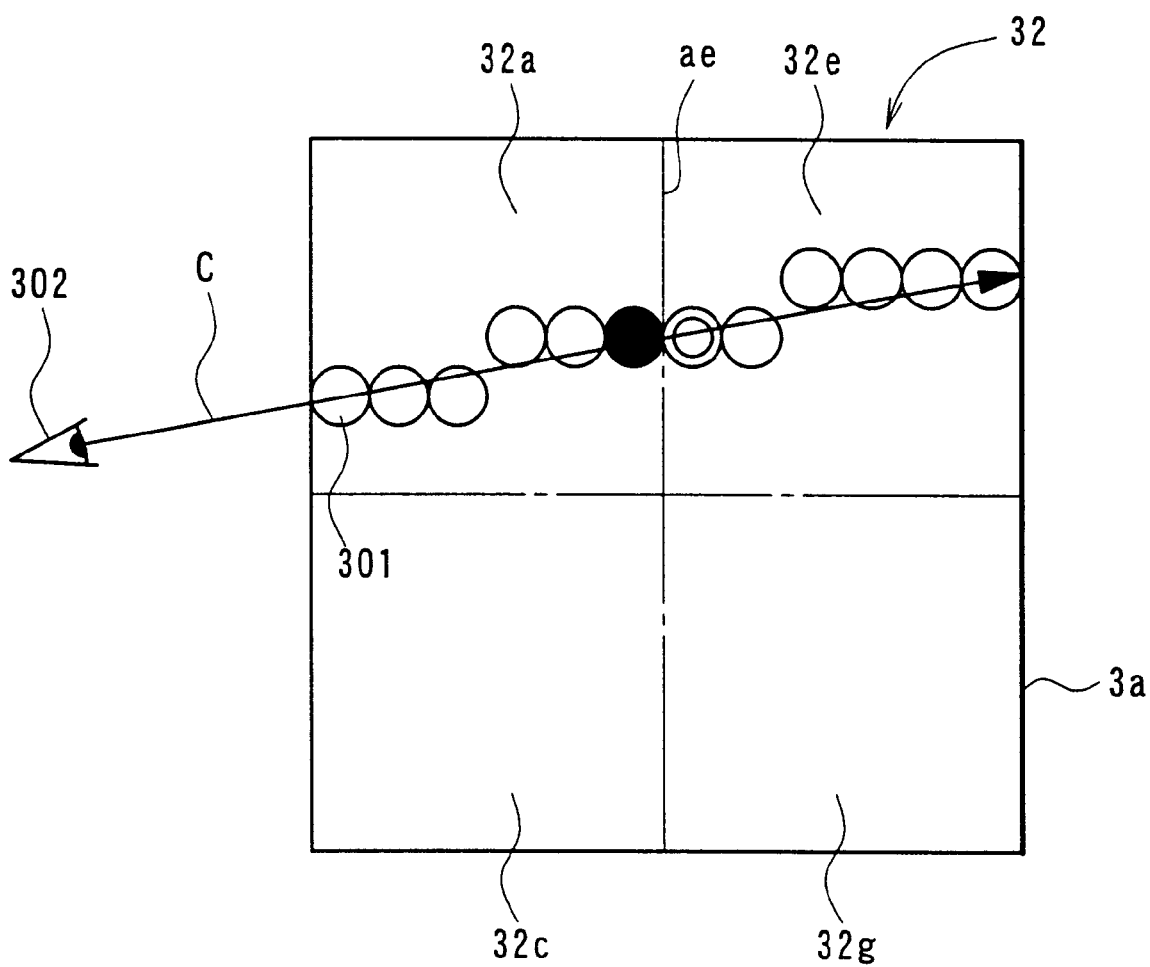
FIG. 23 shows the relationship between the line of sight and the respective voxels in the volume data.

FIG. 23 shows the relationship between the line of sight C generated from the point of sight 302 and the respective voxels 301 in the volume data 32. With reference to FIG. 23, the line of sight C generated from the point of sight 302 enters the divided volume data 32a. The synthesis calculation is firstly performed in the volume data 32a successively along the line of sight C. In FIG. 23, the voxel 301 indicated by the solid circle indicates the position of abutment against the boundary surface ae. The synthesis calculation result up to the voxel 301 is accumulated as the synthesis calculation result up to the boundary surface ae, in the synthesis calculation result-accumulating unit 12b.

After that, when the rendering process is performed for the divided volume data 32e, the synthesis calculation is started from the voxel 301 indicated by the double circle. The synthesis calculation result up to the voxel 301 indicated by the solid circle is read as the synthesis calculation result up to the position described above from the synthesis calculation result-accumulating unit 12b, and it is given as the initial value for the synthesis calculation result of the voxel 301 indicated by the double circle. Subsequently, the rendering process for the volume data 32e is continuously performed along the line of sight C. Upon abutment against the base plane 3a, the synthesis calculation result is written into the base plane memory 27, and the calculation is completed.

Next, explanation will be made for details of the operation of the image synthesis system 40 according to the embodiment of the present invention. The processes, which are executed up to the brightness calculation after reading the volume data 32 from the volume memory 12, are the same as those performed in the first embodiment, explanation of which will be omitted.

In this embodiment, the synthesis calculation unit 26 does not deal with the entire volume data 32 as the operation objective at once. The synthesis calculation process is performed by using the units of the divided pieces of volume data 32a to 32h. The process is successively performed for the respective pieces of divided volume data 32a to 32h.

The process is performed in the synthesis calculation unit 26 to accumulate, one by one, the brightness calculation result for each of the voxels 301 through which the line of sight C passes, concerning the divided volume data 32a (see FIG. 23). The synthesis calculation results up to the previous voxel 301 are accumulated in the synthesis calculation result-accumulating unit 12b. The calculation result necessary for the synthesis calculation is read depending on the direction of the line of sight C to successively perform the cumulative calculation. The synthesis calculation result concerning the volume data 32a is stored in the base plane memory 27, and it is temporarily stored in the synthesis calculation result-accumulating unit 12b to be used as the initial value when the synthesis calculation is performed for the next adjoining divided volume data 32e (see FIG. 23).

When the synthesis calculation is completed for the divided volume data 32a, the synthesis calculation unit 26 performs the synthesis calculation for the next adjoining divided volume data 32e. During this process, the synthesis calculation result temporarily stored in the synthesis calculation result-accumulating unit 12b, i.e., the synthesis calculation result concerning the previous divided volume data 32e is read, and it is used as the initial value for the synthesis calculation concerning the divided volume data 32e.

The calculation process is repeated for the respective pieces of divided volume data 32a to 32h. The final synthesis calculation result is stored in the base plane memory 27.

The synthesis calculation result, which has been stored in the base plane memory 27 as described above, is subjected to the coordinate conversion performed by the coordinate conversion unit 28 to make output to the image display memory 16. The display unit 18 can display an objective image on its display section in accordance with the image data accumulated in the image display memory 16.

Next, in the image synthesis system 40 according to the embodiment of the present invention, the entire volume data 32, which is composed of 512×512×512 (hereinafter referred to as "$512^3$") of voxels, is divided into eight pieces to give pieces of divided volume data 32a to 32h (see FIG. 21) of 256×256×256 (hereinafter referred to as "$256^3$") in order to perform the rendering process. Explanation will be made concerning this process for the memory address format and the data format used when the synthesis calculation results up to the boundary surfaces ab to gh of the respective pieces of divided volume data 32a to 32h are stored in or read from the temporary storage memory (upon the use of 256×64-bit memory).

As shown in FIG. 24A, the address format is composed of 18 bits. The bits of 0 to 7 represent the column address, the bits of 8 to 16 represent the row address, and the bit of 17 represents the bank address. As shown in FIG. 24B, the data format is composed of 64 bits including the two sets of data, i.e., the color data Co of 16 bits and the opacity data α of 16 bits. The opacity data α is the data representing the ratio of existence of the color data Co or the ratio of participation exerted on other colors.

The lower order 8 bits of the respective pieces of 16 bit data are the decimal part. The data necessary for the final image is the high order 8 bits. However, the 16-bit data containing the low order 8 bits is retained during the process of the synthesis calculation in order to ensure the accuracy of the high order 8 bits when the product sum calculation is performed in a cumulative manner in the synthesis calculation.

In the embodiment of the present invention, the rendering can be performed while changing the size of the view volume. There are two cases, i.e., a case in which the memory of $512^3$ is used as one view volume, and a case in which the memory of $513^3$ is divided into eight view volumes of $256^3$ to use different pieces of data respectively. The former case is referred to as "512 mode", and the latter case is referred to as "256 mode". In this process, the rendering of $256^3$ is basic, and the rendering of $512^3$ is realized by 8 times execution.

In the 512 mode, the respective boundary values for u, v, w (see FIG. 21) are read and written depending on the line of sight C and the volume data position. However, when the rendering of $256^3$ is performed, it is necessary to accumulate the synthesis calculation result for one surface concerning the w direction in order to perform the synthesis calculation in conjunction with the next surface. The synthesis calculation result corresponding to the one surface is referred to as "non-boundary".

In order to store the synthesis calculation results for the respective boundaries in the temporary storage memory, the following addresses are required. That is, at the "u" boundary, "u" itself is constant, and hence the addresses of v, w are required. At the "v" boundary, "V" itself is constant, and hence the addresses of u, w are required. At the "w" boundary, "w" itself is constant, and hence the addresses of u, v are required.

FIG. 24C shows the memory address format for the "w" boundary and the non-boundary in the case of the 256 mode and the 512 mode. FIG. 24D shows the data format corresponding thereto. The ninth and eighth bits of the address format represent the mode of use. When the two bits are 0, 0, they indicate the "w" boundary and the non-boundary in the case of the 256 mode and the 512 mode.

FIG. 24E shows the memory address format for the "u" boundary in the case of the 512 mode. FIG. 24F shows the data format corresponding thereto. When the ninth and eighth bits of the address format are 0, 1, they indicate the "v" boundary in the case of the 512 mode. Similarly, FIG. 24G shows the memory address format for the "u" boundary in the case of the 512 mode. FIG. 24H shows the data format corresponding thereto. When the ninth and eighth bits of the address format are 1, 0, they indicate the "v" boundary in the case of the 512 mode.

As for the image synthesis system composed of the 32 parallel pipeline system shown in FIG. 13, the process is simultaneously performed in 32 parallel manner in the "u" direction, as viewed in the coordinate system of u, v, w. In the address format described above, u4-0 is not allotted. Further, two pieces of data are handled at once by using one memory bus 30. Therefore, two pieces of data indicated by 0, 1 in the data format are read and written.

Figures 25A, 25B:
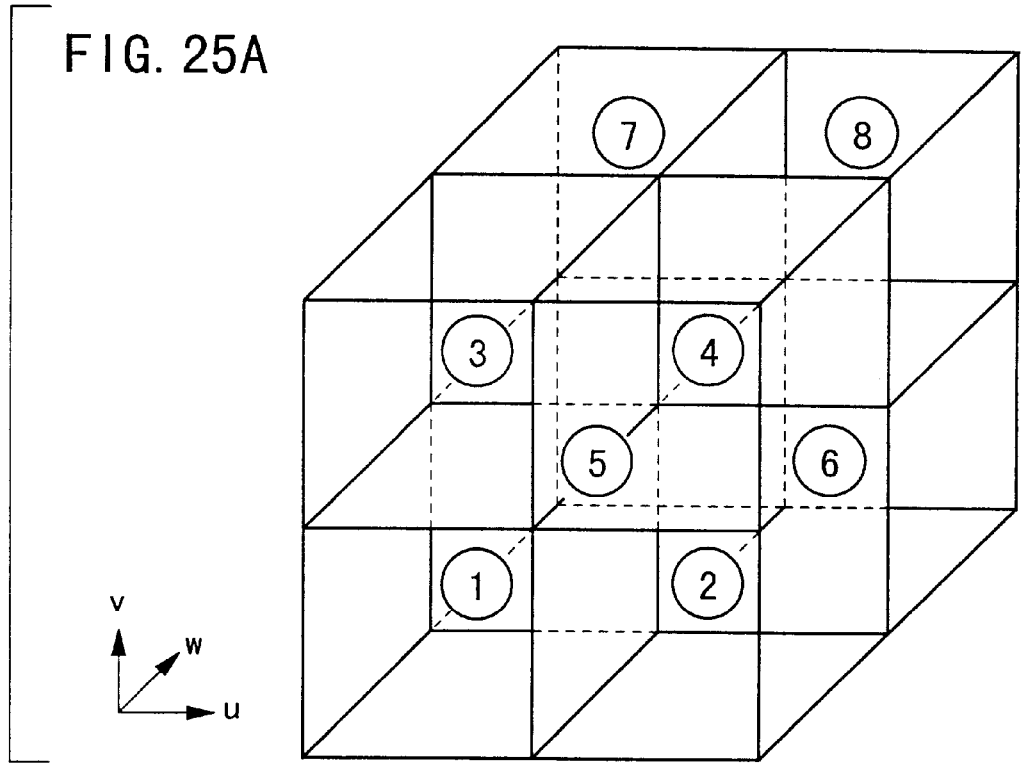
FIG. 25A shows the divided volume data obtained when the entire volume data is divided into eight pieces of divided volume data.
FIG. 25B shows the relationship between positions of the respective pieces of divided volume data shown in FIG. 25A and coordinate values of u, v, and w.

Next, explanation will be made for the sequence of rendering for the divided volume data 32a to 32h. FIG. 25A shows the volume data comprising the divided pieces of volume data 32a to 32h of 256×256×256 obtained by dividing, into eight, the entire volume data 32 composed of the voxels of 512×512×512. In FIG. 25A, numerals ① to ⑧ are numbers affixed to the respective pieces of divided volume data 32a to 32h for the purpose of the following explanation. The positions of the respective pieces of divided volume data ① to ⑧ and the u, v, w coordinate values are shown in FIG. 25B.

FIG. 26A shows the processing sequence for the divided volume data ① to ⑧ depending on the direction of the line of sight C (see FIG. 21) in the volume rendering. The reason why the processing sequence has to be changed depending on the direction of the line of sight C is that the rendering is performed by successively following the voxels along the direction of the line of sight C. In other words, the rendering for the divided volume data disposed far along the line of sight C cannot be performed prior to the rendering for the divided volume data disposed at the nearer position. FIGS. 26B to 26E show, with numerals of 1 to 8, the processing sequence for the divided volume data ① to ⑧ respectively when the direction of the line of sight is the illustrated direction of the line of sight C.

Figure 27:
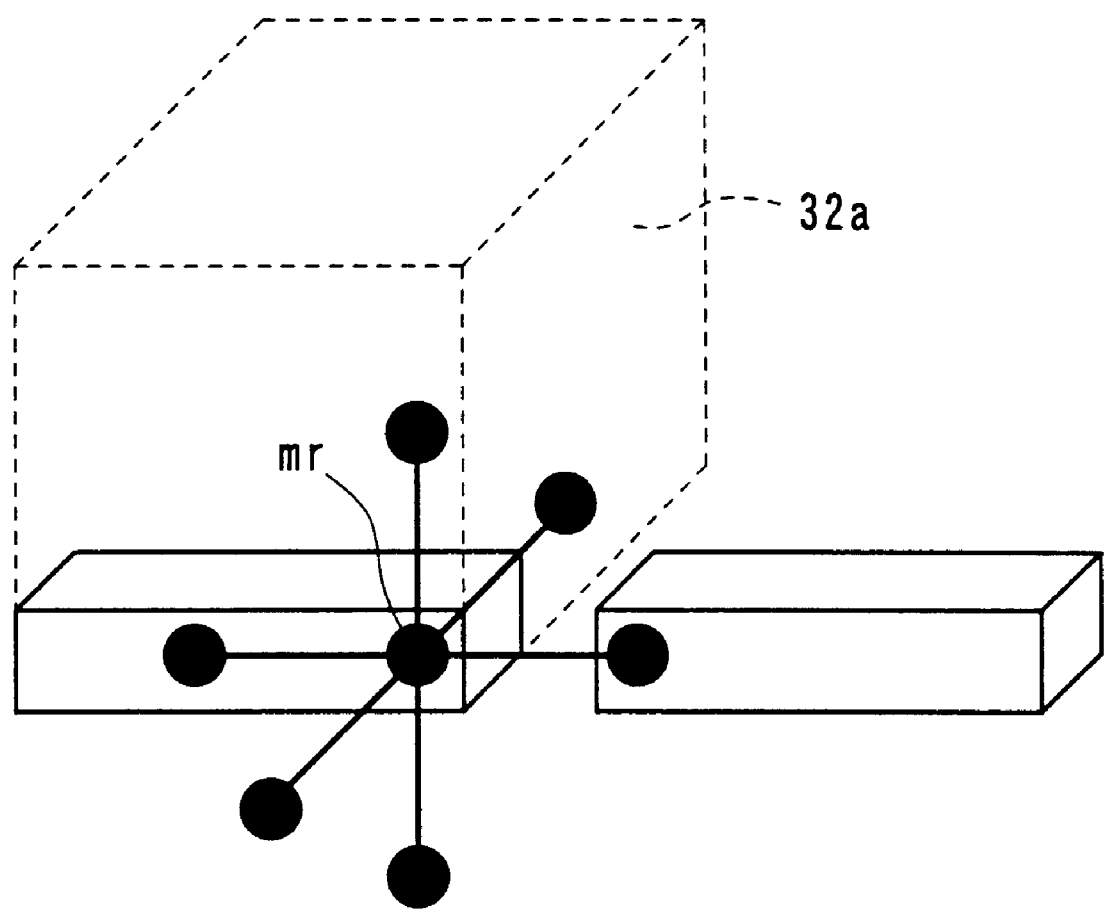
FIG. 27 shows the concept for explaining the reading control for the memory control unit.

When the volume data is divided to perform the rendering as described above, it is necessary for the inclination calculation unit 22 to use the voxels at the portions protruding from the boundary upwardly, downwardly, rightwardly, leftwardly, frontwardly, and backwardly, because of the following reason. That is, as shown in FIG. 27, when the right end mr of the divided volume data 32a during the rendering is the central voxel for the inclination calculation, the process is performed on the basis of the voxels disposed upwardly, downwardly, rightwardly, leftwardly, frontwardly, and backwardly (see FIG. 5) while interposing the central voxel therebetween.

Accordingly, the memory control unit 20, which supplies the volume data to the inclination calculation unit 22, excessively reads the volume data while exceeding the region of the divided volume data in the rendering performed in the divided manner. For example, the following control is made. That is, when the rendering direction is the "u" direction, the volume data of the adjoining left end or right end is excessively read at the right end or left end. In the case of the "v" direction, the volume data is excessively read in an amount of upper or lower one line for each surface to be processed. In the case of the "w" direction, the volume data is excessively read in an amount of one surface at the start or end of the process.

What is claimed is:

1. An image synthesis system comprising:
   a volume memory for accumulating a plurality of pieces of divided volume data obtained by dividing volume data composed of a plurality of voxels defined by numeric data in a three-dimensional space;
   an image processing unit;
   a memory bus for connecting said volume memory to said image processing unit;
   an image display memory for storing image data outputted from said image processing unit; and
   a display unit for displaying said volume data on the basis of said image data stored in said image display memory, wherein said image processing unit includes:
   a memory control unit for reading said volume data comprising units each of which is composed of eight pieces of volume data for constructing a small cube, from said volume memory;

an inclination calculation unit for performing inclination calculation on the basis of volume data of a central voxel and volume data of voxels adjacent to said central voxel, of said volume data read by said memory control unit;

a brightness calculation unit for performing brightness calculation on the basis of a calculation result obtained by said inclination calculation unit;

a synthesis calculation unit for performing synthesis calculation on the basis of a calculation result obtained by said brightness calculation unit along voxels through which an imaginary line of sight arbitrarily set for said volume data passes; and a coordinate conversion unit for performing coordinate conversion for a calculation result obtained by said synthesis calculation unit.

2. The image synthesis system according to claim 1, wherein said volume memory is operated such that said volume data is divided into cubic data comprising units each of which is composed of eight pieces of volume data for constructing a small cube, and said volume data is accumulated by using said units of cubic data to make it possible to perform memory operation.

3. The image synthesis system according to claim 1, wherein said synthesis calculation unit performs said synthesis calculation by using units of divided volume data, and said image processing unit includes a base plane memory for accumulating said calculation result of said synthesis calculation unit.

4. The image synthesis system according to claim 1, wherein said memory control unit reads a plurality of pieces of cubic data corresponding to one array stored continuously in said volume memory, and it includes a plurality of first registers for storing said read pieces of cubic data corresponding to one array as they are, and a plurality of second registers for storing said volume data corresponding to one array for constructing one surface of said cubic data.

5. The image synthesis system according to claim 4, wherein said memory control unit includes a selector for selecting volume data of a central voxel for an inclination calculation process performed by said inclination calculation unit and voxels adjacent to said central voxel from said volume data stored in said plurality of first registers and said plurality of second registers to supply said selected volume data to said inclination calculation unit.

6. The image synthesis system according to claim 4, wherein said memory control unit includes a selector for selecting cubic data to serve as a center for said inclination calculation performed by said inclination calculation unit as well as cubic data adjoining upwardly, cubic data adjoining downwardly, cubic data adjoining frontwardly, and cubic data adjoining backwardly with respect to said cubic data to serve as said center, from said cubic data stored said first registers and said second registers to supply said selected cubic data to said inclination calculation unit.

7. The image synthesis system according to claim 4, wherein each of said first registers and said second registers has a capacity to accumulate volume data corresponding to one array in a depth direction, volume data corresponding to one array in a vertical direction, or volume data corresponding to one array in a lateral direction accumulated continuously in said depth direction, said vertical direction, or said lateral direction of said volume memory.

8. The image synthesis system according to claim 7, wherein said first registers comprise at least three is registers, and said second registers comprise at least two registers.

9. The image synthesis system according to claim 7, wherein said memory control unit reads cubic data corresponding to one lateral array necessary for the next step from said volume memory every time when said voxel to serve said center for said inclination calculation performed by said inclination calculation unit is moved upwardly by one in said cubic data.

10. The image synthesis system according to claim 1, wherein said memory control unit reads said volume data from said volume memory by using units of cubic data, and said inclination calculation unit, said brightness calculation unit, and said synthesis calculation unit decompose said cubic data into pieces of volume data of single voxel to perform a calculation process.

11. The image synthesis system according to claim 1, wherein said image processing unit comprises a plurality of elements for making parallel operation, each of said elements is connected to a plurality of memory elements for constructing said volume memory via said plurality of memory buses, and said volume data is stored in said volume memory, as having skew corresponding to a number of said memory buses.

12. The image synthesis system according to claim 1, wherein said volume memory comprises a temporary storage memory for temporarily storing said synthesis calculation result concerning said divided volume data, and said synthesis calculation result stored in said temporary storage memory is read to be used as an initial value for said synthesis calculation when said synthesis calculation is started for adjacent divided volume data.

13. The image synthesis system according to claim 12, wherein said temporary storage memory is connected via said memory bus to said image processing unit.

14. The image synthesis system according to claim 1, wherein said volume memory successively accumulates cubic data comprising units each of which is composed of eight pieces of volume data, continuously in a depth direction, a vertical direction, and a lateral direction thereof.

15. The image synthesis system according to claim 1, wherein said image processing unit processes respective pieces of cubic data for constructing said entire volume data, successively one surface by one surface starting from cubic data concerning a forwardmost surface.

16. The image synthesis system according to claim 1, wherein a voxel as a processing objective is used as a center, and said inclination calculation unit calculates inclination of said voxel as said processing objective on the basis of a voxel disposed in front of said voxel as said processing objective, a voxel disposed at the back thereof, a voxel disposed at the left thereof, a voxel disposed at the right thereof, a voxel disposed upwardly, and a voxel disposed downwardly.

17. The image synthesis system according to claim 1, wherein said synthesis calculation unit cumulatively calculates brightness data relative to said brightness calculation unit concerning voxels through which an imaginary line of sight generated from an arbitrarily set point of sight passes, by reading said synthesis calculation result concerning a previous voxel accumulated in said volume memory to cumulatively calculate said brightness data relative to said brightness calculation unit so that said data is accumulated in said volume memory.

18. The image synthesis system according to claim 1, wherein said volume data is measurement data obtained by using an ultrasonic wave diagnosis apparatus.

19. The image synthesis system according to claim 18, wherein said measurement data is density data of tissue in a living body.

20. The image synthesis system according to claim 1, wherein said volume memory is constructed to be capable of connection to a high speed data transfer bus, and it is connected to said image processing unit by using said high speed data transfer bus.

21. The image synthesis system according to claim 1, wherein said image processing unit comprises a plurality of ASIC's, and each image processing unit is constructed to perform pipeline processing for processing of said volume data corresponding to one lateral array, reading of subsequent volume data corresponding to one lateral array from said volume memory, reading of said synthesis calculation result from said synthesis calculation result-accumulating unit, and processing of storage of said synthesis calculation result in said synthesis calculation result-accumulating unit.

22. The image synthesis system according to claim 21, wherein said image processing unit comprises eight ASIC's, and each of them is connected to said volume memory by using two high speed data transfer buses.

23. The image synthesis system according to claim 1, wherein said volume data is divided into eight pieces of divided volume data.

24. The image synthesis system according to claim 1, wherein said image processing unit has a first processing mode for performing calculation while using said entire volume data as one view volume, and a second processing mode for performing calculation while using said divided volume data as view volumes.

25. The image synthesis system according to claim 24, wherein said first processing mode and said second processing mode are determined by a specified bit in address information used when said synthesis calculation result relative to said synthesis calculation unit is written into or read from said volume memory for temporary storage.

26. The image synthesis system according to claim 1, wherein said image processing unit changes a calculation process sequence of said divided volume data depending on a direction of an imaginary line of sight generated from an arbitrarily set point of sight.

27. The image synthesis system according to claim 1, wherein when a central voxel for said inclination calculation performed in said inclination calculation unit is a voxel disposed at an outermost end contacting with a boundary of said divided volume data, said memory control unit reads, from said volume memory, said volume data of a voxel adjacent to said central voxel for said inclination calculation, at an outermost end of adjacent divided volume data with said boundary intervening therebetween.

* * * * *

UNITED STATES PATENT AND TRADEMARK OFFICE
CERTIFICATE OF CORRECTION

PATENT NO. : 6,369,817 B1
DATED : April 9, 2002
INVENTOR(S) : Sachio Yamato

It is certified that error appears in the above-identified patent and that said Letters Patent is hereby corrected as shown below:

<u>Title page,</u>
Item [75], Inventors, change "Eucyu:" to -- Fucyu: --.

Signed and Sealed this

Twenty-ninth Day of July, 2003

JAMES E. ROGAN
*Director of the United States Patent and Trademark Office*